US011638321B2

(12) United States Patent
Sakhnini et al.

(10) Patent No.: US 11,638,321 B2
(45) Date of Patent: Apr. 25, 2023

(54) USER EQUIPMENT SIGNALING OF TEMPORARY CHANGE IN SERVICE AVAILABILITY

(71) Applicant: QUALCOMM Incorporated, San Diego, CA (US)

(72) Inventors: Iyab Issam Sakhnini, San Diego, CA (US); Tao Luo, San Diego, CA (US); Jelena Damnjanovic, Del Mar, CA (US); Peter Gaal, San Diego, CA (US); Juan Montojo, San Diego, CA (US); Wanshi Chen, San Diego, CA (US); Junyi Li, Franklin Park, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 24 days.

(21) Appl. No.: 17/354,490

(22) Filed: Jun. 22, 2021

(65) Prior Publication Data

US 2022/0039193 A1 Feb. 3, 2022

Related U.S. Application Data

(60) Provisional application No. 63/059,729, filed on Jul. 31, 2020.

(51) Int. Cl.
*H04W 76/25* (2018.01)
*H04W 76/10* (2018.01)
*H04W 72/04* (2023.01)
*H04W 76/28* (2018.01)
*H04W 4/16* (2009.01)

(52) U.S. Cl.
CPC ....... *H04W 76/25* (2018.02); *H04W 72/0406* (2013.01); *H04W 72/048* (2013.01); *H04W 76/10* (2018.02); *H04W 76/28* (2018.02); *H04W 4/16* (2013.01)

(58) Field of Classification Search
CPC ............ H04W 76/25; H04W 72/0406; H04W 72/048; H04W 76/10; H04W 76/28; H04W 4/16; H04W 76/27; H04W 48/12; H04W 24/04
See application file for complete search history.

(56) References Cited

U.S. PATENT DOCUMENTS

| | | | | |
|---|---|---|---|---|
| 2005/0020243 | A1* | 1/2005 | Benco | H04W 8/18 455/406 |
| 2009/0312031 | A1* | 12/2009 | Harris | H04L 47/805 455/452.1 |
| 2018/0302914 | A1* | 10/2018 | da Silva | H04W 72/1289 |

* cited by examiner

*Primary Examiner* — Ayanah S George
(74) *Attorney, Agent, or Firm* — The Marbury Law Group

(57) ABSTRACT

Embodiments include systems and methods for UE signaling a network regarding customized ringing signal (CRS) capability and use of such information by the network. Various embodiments may receiving from the network an INVITE message notifying the UE of an incoming call, determining whether the INVITE message indicates that the network provides CRS service if the UE supports a CRS function, and including an indication in a response to the INVITE that the UE supports the CRS function in response to determining that the INVITE message includes an alert information header field indicating that the network provides CRS service. Various embodiments include a network computing device receiving such information and performing negotiations for CRS service with the UE only if the UE indicates CRS functional capability.

29 Claims, 11 Drawing Sheets

USER EQUIPMENT SIGNALING OF TEMPORARY CHANGE IN SERVICE AVAILABILITY

RELATED APPLICATIONS

This application claims the benefit of priority to U.S. Provisional Application No. 63/059,729, entitled "User Equipment Signaling of Temporary Change In Service Availability" filed Jul. 31, 2020, the entire contents of which are hereby incorporated by reference for all purposes.

BACKGROUND

Long Term Evolution (LTE), Fifth Generation (5G) new radio (NR)(5GNR), and other recently developed communication technologies have enabled the deployment of new products leveraging such wireless communication networks. Examples include Internet of Things (IOT), large scale Machine to Machine (M2M) communication systems, autonomous vehicles, and other technologies that rely on consistent and secure communications.

One example of new types of NR-enabled devices are referred to as reduced capability (RedCap) devices that leverage new wireless communication technologies to communicate data that was previously carried over wire-based networks. Video surveillance cameras are an example of RedCap devices. Video surveillance cameras and other RedCap devices may be subject to temporary or periodic interruptions in wireless connectivity or reductions in service availability due to how such devices may be deployed or operated. Such interruptions or reductions in service availability may trigger a base station to conclude the devices have gone out of service and terminate their connection to the wireless network even though the devices remain in place and in service. When this happens, such devices need to repeat the procedures for connecting to the wireless network, which takes time, bandwidth and power to complete.

SUMMARY

Various aspects include systems and methods for a wireless user equipment (UE) to signal a base station of a wireless communication network about a temporary change in service availability of the UE before the temporary change in service availability occurs so that the base station can take actions to maintain a link to the UE during the temporary change in service availability. Various aspects may include establishing with a base station a communication link supporting communication services between the UE and the base station; and transmitting a message to the base station indicating a temporary change in service availability of the UE before the temporary change in service availability occurs In some aspects, transmitting the message to the base station indicating the temporary change in service availability of the UE before the temporary change in service availability occurs may include transmitting a message indicating an immediate change in service availability. Some aspects may further include transmitting a message to the base station requesting resumption of full service following the conclusion of temporary change in service availability. In some aspects, transmitting the message to the base station indicating the temporary change in service availability of the UE before the temporary change in service availability occurs may include transmitting a message indicating a future time when a change in service availability will occur. In some aspects, transmitting the message to the base station indicating the temporary change in service availability of the UE before the temporary change in service availability occurs may include determining a time schedule of temporary changes in service availability of the UE, and including the time schedule in the message transmitted to the UE.

In some aspects, transmitting the message to the base station indicating the temporary change in service availability of the UE before the temporary change in service availability occurs may include transmitting the message indicating a time and duration when the UE will experience the temporary change in service availability. In some aspects, transmitting the message to the base station indicating the temporary change in service availability of the UE before the temporary change in service availability occurs may include transmitting the message indicating one or more services or procedures that the UE will not be able to perform during the temporary change in service availability. In some aspects, transmitting the message to the base station indicating the temporary change in service availability of the UE before the temporary change in service availability occurs may include transmitting the message indicating one or more services or procedures that the UE will be able to perform during the temporary change in service availability. In some aspects, transmitting the message to the base station indicating the temporary change in service availability of the UE before the temporary change in service availability occurs may include transmitting a message requesting the base station to inform the UE of one or more settings or parameters that the UE should implement after the temporary change in service availability is over.

Some aspects may further include suspending radio resource management functionality by the UE during the temporary change in service availability. Some aspects may further include entering an idle radio resource control state during the temporary change in service availability.

Some aspects may further include receiving a message from the base station responding to the message transmitted to the base station, and implementing instructions in the message received from the base station in which implementing instructions in the message received from the base station may include one of: implementing an indicated temporary change in service availability in response to the message received from the base station acknowledging or approving the temporary change in service availability; implementing service settings, parameters or procedures related to the temporary change in service availability indicated in the message received from the base station; or attempting to maintain service with the base station in response to the message received from the base station rejecting the temporary change in service availability.

Some aspects may further include receiving a message from the base station including information for one or more procedures to be implemented by the UE during the temporary change in service availability, and implementing the one or more procedures during the temporary change in service availability.

Some aspects may further include receiving a message from the base station including information for one or more procedures to be implemented by the UE after the temporary change in service availability, and implementing the one or more procedures upon resuming service following the temporary change in service availability.

Further aspects include a UE having a processor configured to perform one or more operations of the methods summarized above. Further aspects may include a non-transitory processor-readable storage medium having stored thereon processor-executable instructions configured to cause a processor of a UE to perform operations of the methods summarized above. Further aspects include a UE having means for performing functions of the methods summarized above. Further aspects include a system on chip for use in a UE that includes a processor configured to perform one or more operations of the methods summarized above. Further aspects include a system in a package that includes two systems on chip for use in a UE that includes a processor configured to perform one or more operations of the methods summarized above.

Further aspects include methods that may be performed by a processor of a base station in a wireless communication network for maintaining wireless communications with a UE in response to receiving information that the UE will experience a temporary change in service availability. Various aspects may include establishing with a UE a communication link supporting communication services between the UE and the base station, receiving a message from the UE indicating a temporary change in service availability of the UE, and taking an action in response to the message from the UE to accommodate the indicated temporary change in service availability. In some aspects, taking an action in response to the message from the UE may include avoiding declaring the UE is out of service during the indicated temporary change in service availability.

In some aspects, the message received from the UE may indicate an immediate change in service availability, and taking an action in response to the message from the UE may include maintaining a link with the UE during the immediate change in service availability. In some aspects, receiving a message from the UE requesting resumption of service following a change in service availability, and resuming full service with UE.

In some aspects, the message received from the UE may indicate a future time when a change in service availability of the UE will occur, and taking an action in response to the message from the UE may include scheduling communications to the UE and maintaining a link with the UE during the indicated future time when the change in service availability occurs. In some aspects, the message received from the UE includes a time schedule when a changes in service availability of the UE will occur, and taking an action in response to the message from the UE may include scheduling communications to the UE and maintaining a link with the UE during periods of changed UE service availability identified in the time schedule. In some aspects, the message received from the UE may indicate a time and duration when the UE will experience the temporary change in service availability, and taking an action in response to the message from the UE may include maintaining a link with the UE at the indicated time and for the indicated duration while communications with the UE are not possible.

In some aspects, the message received from the UE may indicate one or more services or procedures that the UE will not be able to perform during the temporary change in service availability, and taking an action in response to the message from the UE may include avoiding requesting or expecting the indicated one or more services or procedures that the UE will not be able to perform and maintaining a link with the UE during the temporary change in service availability. In some aspects, the message received from the UE may indicate one or more services or procedures that the UE will be able to perform during the temporary change in service availability, and taking an action in response to the message from the UE may include limiting interactions with the UE to the indicated one or more services or procedures that the UE will be able to perform during the temporary change in service availability.

In some aspects, taking an action in response to the message from the UE may include transmitting a message to the UE acknowledging or accepting the temporary change in service availability. In some aspects, taking an action in response to the message from the UE may include determining one or more adjustments to settings, parameters or procedures related to the indicate temporary change in service availability, and transmitting a message to the UE directing the UE to implement the one or more adjustments to settings, parameters or procedures during the indicate temporary change in service availability. In some aspects, taking an action in response to the message from the UE may include determining whether the indicated temporary change in service availability is acceptable, and transmitting a message to the UE directing the UE to not implement the indicate temporary change in service availability in response to determining that the indicated temporary change in service availability is not acceptable.

In some aspects, taking an action in response to the message from the UE may include determining one or more procedures to be implemented by the UE during the temporary change in service availability, and transmitting a message to the UE directing the UE to implement the one or more procedures to be implemented by the UE during the temporary change in service availability. In some aspects, taking an action in response to the message from the UE may include determining one or more procedures to be implemented by the UE after the temporary change in service availability, and transmitting a message to the UE directing the UE to implement the one or more procedures to be implemented by the UE after the temporary change in service availability.

Further aspects may include a base station having a processor configured to perform one or more operations of the methods summarized above. Further aspects may include a non-transitory processor-readable storage medium having stored thereon processor-executable instructions configured to cause a processor of a base station to perform operations of the methods summarized above. Further aspects include a base station having means for performing functions of the methods summarized above.

BRIEF DESCRIPTION OF THE DRAWINGS

The accompanying drawings, which are incorporated herein and constitute part of this specification, illustrate exemplary embodiments of the claims, and together with the general description given above and the detailed description given below, serve to explain the features of the claims.

DETAILED DESCRIPTION

Figure 1:
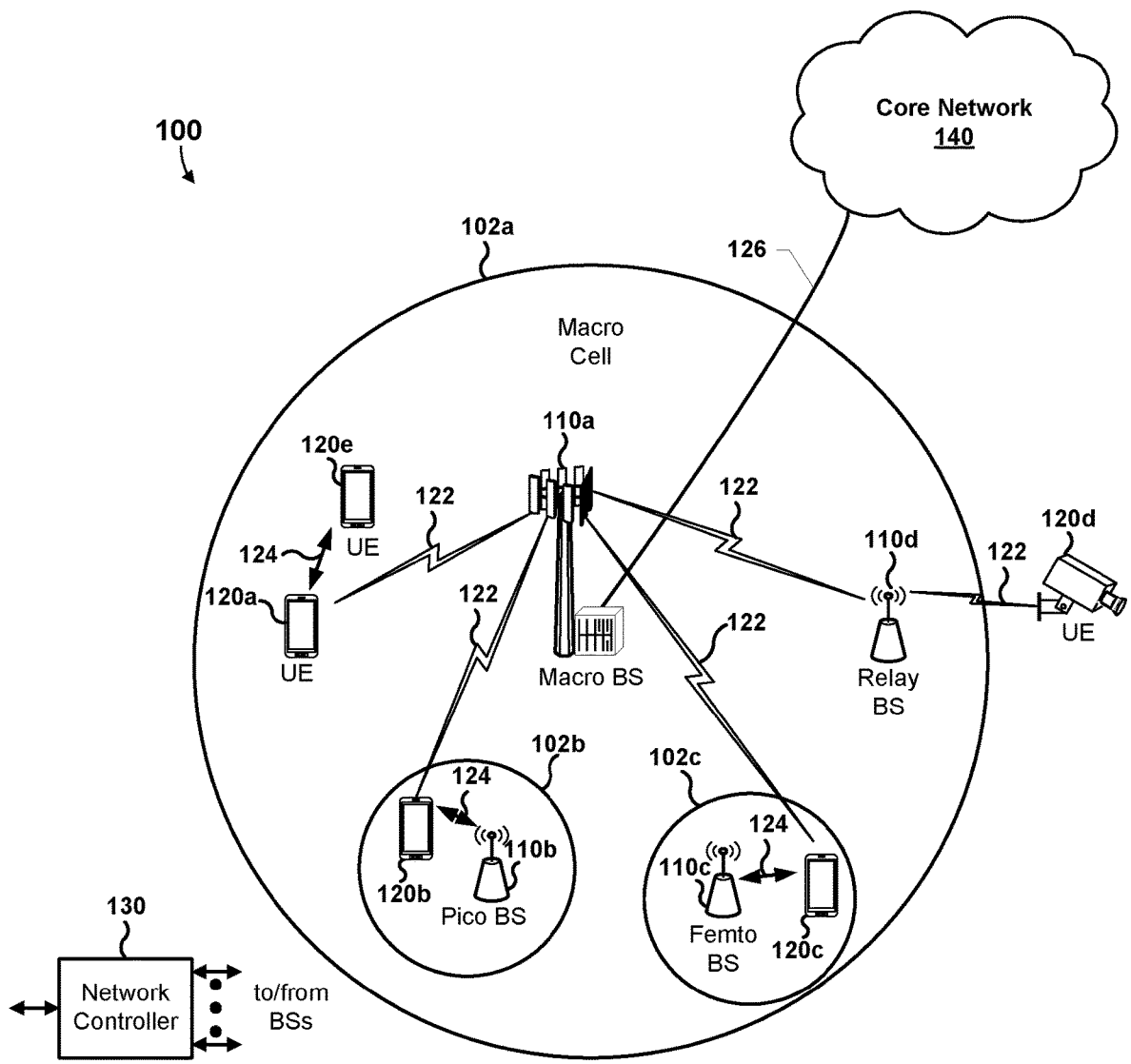
FIG. 1 is a system block diagram illustrating an example communication system suitable for implementing any of the various embodiments.

Various embodiments will be described in detail with reference to the accompanying drawings. Wherever possible, the same reference numbers will be used throughout the drawings to refer to the same or like parts. References made to particular examples and embodiments are for illustrative purposes, and are not intended to limit the scope of the claims.

Some RedCap products being developed to make use of the Fifth Generation (5G) new radio (NR) (5GNR) communications technologies are expected to be deployed in applications and locations that may be subject to periodic or episodic temporary changes in service availability ranging from temporary suspension or failure of some processes or communications to complete out of coverage for periods of time. An illustrative example of such a RedCap product is a surveillance camera that uploads video imagery via a 5GNR network and periodically reorients the camera. With each move, some or total service availability may be lost, such as by being blocked by structures or the antenna pointing in a different direction. For example, the rotation of such a camera could affect beam failure detection (BFD) and beam failure recovery (BFR) procedures, such as causing the UE to detect a beam failure and go into a recovery mode unnecessarily. If BFR fails, the UE may declare radio link failure (RLF), which may be a time and resource consuming process. Further, during such periods, the UE may not be able to receive messages from or transmit messages to a base station, and as a consequence cause unnecessary resource usage by the network trying to communicate with the UE. This could result in the base station placing the camera UE in an out of service state, discontinuing the communication link to the UE, even though the camera remains in the same location. Thus, RedCap products may suffer from disruption in service if treated by base stations like mobile UE (e.g., smartphones). However, base stations cannot know the circumstances of RedCap products to be able to distinguish temporary changes in service availability from true out of service conditions.

Various embodiments include systems, methods and devices implementing the methods for enabling a UE to inform a base station about a temporary change in service availability of the UE before the temporary change in service availability occurs so that the base station can take actions to maintain a link to the UE during the temporary change in service availability. Various embodiments may include transmitting a message to the base station indicating a temporary change in service availability of the UE before the temporary change in service availability occurs. Various embodiments further include methods that enable a base station to take advantage of this information to maintain communication links with the UE, as well as to inform or instruct the UE on how to operate during the temporary change in service availability and/or how to recover full communication services with the base station.

In the technical standards for Long Term Evolution (LTE), 5G, 5GNR, and other wireless technologies, wireless UEs that communicate with such wireless networks are referred to as "user equipment." Therefore, the terms "user equipment" and "UE" are used herein to refer to any one or all of cellular telephones, smartphones, portable computing devices, personal or mobile multimedia players, laptop computers, tablet computers, smartbooks, ultrabooks, palmtop computers, wireless electronic mail receivers, multimedia Internet-enabled cellular telephones, wireless router devices, wireless appliances, medical devices and equipment, entertainment devices (e.g., wireless gaming controllers, music and video players, satellite radios, etc.), wireless communication elements within autonomous and semiautonomous vehicles, UEs affixed to or incorporated into various mobile platforms, and similar electronic devices that include a memory, wireless communication components and a programmable processor.

The term "system-on-chip" (SOC) is used herein to refer to a single integrated circuit (IC) chip that contains multiple resources and/or processors integrated on a single substrate. A single SOC may contain circuitry for digital, analog, mixed-signal, and radio-frequency functions. A single SOC may also include any number of general purpose and/or specialized processors (digital signal processors, modem processors, video processors, etc.), memory blocks (e.g., ROM, RAM, Flash, etc.), and resources (e.g., timers, voltage regulators, oscillators, etc.). SOCs may also include software for controlling the integrated resources and processors, as well as for controlling peripheral devices.

The term "system-in-a-package" may be used herein to refer to a single module or package that contains multiple resources, computational units, cores and/or processors on two or more IC chips, substrates, or SOCs. For example, a system-in-a-package may include a single substrate on which multiple IC chips or semiconductor dies are stacked in a vertical configuration. Similarly, the system-in-a-package may include one or more multi-chip modules (MCMs) on which multiple ICs or semiconductor dies are packaged into a unifying substrate. A system-in-a-package may also include multiple independent SOCs coupled together via high speed communication circuitry and packaged in close proximity, such as on a single motherboard or in a single UE. The proximity of the SOCs facilitates high speed communications and the sharing of memory and resources.

As used herein, the terms "network," "system," "wireless network," "cellular network," and "wireless communication network" may interchangeably refer to a portion or all of a wireless network of a carrier associated with a UE and/or subscription on a UE. The techniques described herein may be used for various wireless communication networks, such as Code Division Multiple Access (CDMA), time division multiple access (TDMA), FDMA, orthogonal FDMA (OFDMA), single carrier FDMA (SC-FDMA) and other networks. In general, any number of wireless networks may be deployed in a given geographic area. Each wireless network may support at least one radio access technology, which may operate on one or more frequency or range of frequencies. For example, a CDMA network may implement Universal Terrestrial Radio Access (UTRA) (including Wideband Code Division Multiple Access (WCDMA) standards), CDMA2000 (including IS-2000, IS-95 and/or IS-856 standards), etc. In another example, a TDMA network may implement GSM Enhanced Data rates for GSM Evolution (EDGE). In another example, an OFDMA network may implement Evolved UTRA (E-UTRA) (including LTE standards), IEEE 802.11 (WiFi), IEEE 802.16 (WiMAX), IEEE 802.20, Flash-OFDM®, etc. Reference may be made to wireless networks that use LTE standards, and therefore the terms "Evolved Universal Terrestrial Radio Access," "E-UTRAN" and "eNodeB" may also be used interchangeably herein to refer to a wireless network. However, such references are provided merely as examples, and are not intended to exclude wireless networks that use other communication standards. For example, while various Third Generation (3G) systems, Fourth Generation (4G) systems, and Fifth Generation (5G) systems are discussed herein, those systems are referenced merely as examples and future generation systems (e.g., sixth generation (6G) or higher systems) may be substituted in the various examples.

LTE is a mobile network standard for 4G wireless communication of high-speed data developed by the 3GPP (3rd Generation Partnership Project) and specified in its Release 8 document series. The 5G system is an advanced technology from 4G LTE, and provides a new radio access technology (RAT) through the evolution of the existing mobile communication network structure.

Wireless communication networks provide connectivity to UEs via wireless communication links within cells centered around base stations. In the technical standards, base stations are referred to using various terms. An LTE network base station is referred to as an evolved Node B or eNodeB. The base stations for 5G systems or networks, including 5GNR networks, are referred to as Next Generation NodeBs, gNodeBs or gNBs. Future generation systems (e.g., sixth generation (6G) or higher systems) may use different terminology for base stations. For ease of reference the term "base station" is used herein to refer to any form a network element that provides the wireless communication links to UEs, including without limitation a NodeB, eNode B, gNode B, an access point (AP), a Radio head, a transmit receive point (TRP), a New Radio base station (NR BS), a 5G NodeB (NB), a Next Generation NodeB (gNodeB or gNB), and the like.

Various embodiments include methods for UEs to signal a base station about a temporary change in service availability of the UE before the temporary change in service availability occurs so that the base station can take actions to maintain a link to the UE during the temporary change in service availability. Such messages may be transmitted immediately before such a change happens, or some time in advance of the change, such as indicating a future time and possibly a duration, or providing a time schedule of anticipated or periodic temporary changes in service availability.

UEs implementing various embodiments may include in the messages to base stations information about the nature of the temporary change in serviced availability, such as whether the change is a temporary complete out of service condition or an inability to perform some processors or procedures, such as downlink reception, uplink reception, and/or link maintenance operations. UEs implementing various embodiments may include in the messages to base stations information about the processes or procedures the UE will be performing during the temporary changes in service availability.

UEs may receive messages from the base station in response to the message transmitted to the base station providing information for settings, processes or procedures that the UE should implement during and/or after the temporary change in service availability.

Further embodiments include methods that may be performed by a processor of a base station in a wireless communication network for maintaining wireless communications with a UE in response to receiving messages indicating that the UE will experience a temporary change in service availability. Base stations may take various actions in response, such as avoiding declaring the UE is out of service during the indicated temporary change in service availability, and/or informing the UE of settings, processes or procedures that the UE should implement during and/or after the temporary change in service availability. Base stations may also respond to the messages from a UE by indicating that the UE should not initiate the change in service availability. For example, a base station may send an acknowledgement or control message to the UE in response to the UE's message regarding the temporary change in service availability. In some circumstances, the base station may respond to the UE by scheduling communications to the UE and maintaining a link with the UE during the indicated future time when change in service availability occurs. In some circumstances, the base station may respond to the UE by scheduling communications to the UE and maintaining the link with the UE during periods of changed UE service availability identified in a time schedule. In some circumstances, the base station may respond to the UE by maintaining a link with the UE at the indicated time and for the indicated duration while communications with the UE are not possible. In some embodiments, the base station messages may be sent as a radio resource control (RRC) message, a medium access control-control element (MAC-CE), or a downlink control information (DCI), which may be transmitted over a physical downlink control channel (PDCCH) or a physical downlink shared channel (PDSCH).

In some circumstances, the base station may avoid requesting or expecting the indicated one or more services or procedures that the UE will not be able to perform and maintaining a link with the UE during the temporary change in service availability. In some circumstances, the base station may limit interactions with the UE to services or procedures the UE indicates it will perform during the temporary change in service availability.

FIG. 1 is a system block diagram illustrating an example communication system 100 suitable for implementing any of the various embodiments. The communications system 100 may be a 5GNR network, or any other suitable network such as an LTE network, 5G network, etc. While FIG. 1 illustrates a 5G network, later generation networks may include the same or similar elements. Therefore, the reference to a 5G network and 5G network elements in the following descriptions is for illustrative purposes and is not intended to be limiting.

The communications system 100 may include a heterogeneous network architecture that includes a core network 140 and a variety of mobile devices (illustrated as UE 120a-120e in FIG. 1). The communications system 100 may also include a number of base stations (illustrated as the BS 110a, the BS 110b, the BS 110c, and the BS 110d) and other network entities. Each base station may provide communication coverage for a particular geographic area. In 3GPP, the term "cell" can refer to a coverage area of a base station, a base station Subsystem serving this coverage area, or a combination thereof, depending on the context in which the term is used. The core network 140 may be any type core network, such as an LTE core network (e.g., an Evolved Packet Core (EPC) network), 5G core network, etc.

A base station 110a-110d may provide communication coverage for a macro cell, a pico cell, a femto cell, another type of cell, or a combination thereof. A macro cell may cover a relatively large geographic area (for example, several kilometers in radius) and may allow unrestricted access by mobile devices with service subscription. A pico cell may cover a relatively small geographic area and may allow unrestricted access by mobile devices with service subscription. A femto cell may cover a relatively small geographic area (for example, a home) and may allow restricted access by mobile devices having association with the femto cell (for example, mobile devices in a closed subscriber group (CSG)). A base station for a macro cell may be referred to as a macro BS. A base station for a pico cell may be referred to as a pico BS. A base station for a femto cell may be referred to as a femto BS or a home BS. In the example illustrated in FIG. 1, a base station 110a may be a macro BS for a macro cell 102a, a base station 110b may be a pico BS for a pico cell 102b, and a base station 110c may be a femto BS for a femto cell 102c. A base station 110a-110d may support one or multiple (for example, three) cells. The terms "eNB", "base station", "NR BS", "gNB", "TRP", "AP", "node B", "5G NB", and "cell" may be used interchangeably herein.

In some examples, a cell may not be stationary, and the geographic area of the cell may move according to the location of a mobile base station. In some examples, the base stations 110a-110d may be interconnected to one another as well as to one or more other base stations or network nodes (not illustrated) in the communications system 100 through various types of backhaul interfaces, such as a direct physical connection, a virtual network, or a combination thereof using any suitable transport network The base station 110a-110d may communicate with the core network 140 over a wired or wireless communication link 126. The UE 120a-120e may communicate with the base station 110a-110d over a wireless communication link 122.

The wired communication link 126 may use a variety of wired networks (e.g., Ethernet, TV cable, telephony, fiber optic and other forms of physical network connections) that may use one or more wired communication protocols, such as Ethernet, Point-To-Point protocol, High-Level Data Link Control (HDLC), Advanced Data Communication Control Protocol (ADCCP), and Transmission Control Protocol/Internet Protocol (TCP/IP).

The communications system 100 also may include relay stations (e.g., relay BS 110d). A relay station is an entity that can receive a transmission of data from an upstream station (for example, a base station or a mobile device) and transmit the data to a downstream station (for example, a UE or a base station). A relay station also may be a mobile device that can relay transmissions for other UEs. In the example illustrated in FIG. 1, a relay station 110d may communicate with macro the base station 110a and the UE 120d in order to facilitate communication between the base station 110a and the UE 120d. A relay station also may be referred to as a relay base station, a relay base station, a relay, etc.

The communications system 100 may be a heterogeneous network that includes base stations of different types, for example, macro base stations, pico base stations, femto base stations, relay base stations, etc. These different types of base stations may have different transmit power levels, different coverage areas, and different impacts on interference in communications system 100. For example, macro base stations may have a high transmit power level (for example, 5 to 40 Watts) whereas pico base stations, femto base stations, and relay base stations may have lower transmit power levels (for example, 0.1 to 2 Watts).

A network controller 130 may couple to a set of base stations and may provide coordination and control for these base stations. The network controller 130 may communicate with the base stations via a backhaul. The base stations also may communicate with one another, for example, directly or indirectly via a wireless or wireline backhaul.

The UEs 120a, 120b, 120c may be dispersed throughout communications system 100, and each UE may be stationary or mobile. A UE also may be referred to as an access terminal, a terminal, a mobile station, a subscriber unit, a station, user equipment (UE), etc.

A macro base station 110a may communicate with the communication network 140 over a wired or wireless communication link 126. The UE 120a, 120b, 120c may communicate with a base station 110a-110d over a wireless communication link 122.

The wireless communication links 122, 124 may include a plurality of carrier signals, frequencies, or frequency bands, each of which may include a plurality of logical channels. The wireless communication links 122 and 124 may utilize one or more Radio access technologies (RATs). Examples of RATs that may be used in a wireless communication link include 3GPP LTE, 3G, 4G, 5G (e.g., NR), GSM, CDMA, WCDMA, Worldwide Interoperability for Microwave Access (WiMAX), Time Division Multiple Access (TDMA), and other mobile telephony communication technologies cellular RATs. Further examples of RATs that may be used in one or more of the various wireless communication links 122, 124 within the communication system 100 include medium range protocols such as Wi-Fi, LTE-U, LTE-Direct, LAA, MuLTEfire, and relatively short range RATs such as ZigBee, Bluetooth, and Bluetooth Low Energy (LE).

Certain wireless networks (e.g., LTE) utilize orthogonal frequency division multiplexing (OFDM) on the downlink and single-carrier frequency division multiplexing (SC-FDM) on the uplink. OFDM and SC-FDM partition the system bandwidth into multiple (K) orthogonal subcarriers, which are also commonly referred to as tones, bins, etc. Each subcarrier may be modulated with data. In general, modulation symbols are sent in the frequency domain with OFDM and in the time domain with SC-FDM. The spacing between adjacent subcarriers may be fixed, and the total number of subcarriers (K) may be dependent on the system bandwidth. For example, the spacing of the subcarriers may be 15 kHz and the minimum Resource allocation (called a "resource block") may be 12 subcarriers (or 180 kHz). Consequently, the nominal Fast File Transfer (FFT) size may be equal to 128, 256, 512, 1024 or 2048 for system bandwidth of 1.25, 2.5, 5, 10 or 20 megahertz (MHz), respectively. The system bandwidth may also be partitioned into subbands. For example, a subband may cover 1.08 MHz (i.e., 6 Resource blocks), and there may be 1, 2, 4, 8 or 16 subbands for system bandwidth of 1.25, 2.5, 5, 10 or 20 MHz, respectively.

While descriptions of some embodiments may use terminology and examples associated with LTE technologies, some embodiments may be applicable to other wireless communications systems, such as a NR or 5G network. NR may utilize OFDM with a cyclic prefix (CP) on the uplink (UL) and downlink (DL) and include support for half-duplex operation using time division duplex (TDD). A single component carrier bandwidth of 100 MHz may be supported. NR Resource blocks may span 12 sub-carriers with a sub-carrier bandwidth of 75 kHz over a 0.1 millisecond (ms) duration. Each Radio frame may consist of 50 subframes with a length of 10 ms. Consequently, each subframe may have a length of 0.2 ms. Each subframe may indicate a link direction (i.e., DL or UL) for data transmission and the link direction for each subframe may be dynamically switched. Each subframe may include DL/UL data as well as DL/UL control data. Beamforming may be supported and beam direction may be dynamically configured. Multiple Input Multiple Output (MIMO) transmissions with precoding may also be supported. MIMO configurations in the DL may support up to eight transmit antennas with multi-layer DL transmissions up to eight streams and up to two streams per UE. Multi-layer transmissions with up to 2 streams per UE may be supported. Aggregation of multiple cells may be supported with up to eight serving cells. Alternatively, NR may support a different air interface, other than an OFDM-based air interface.

Some mobile devices may be considered machine-type communication (MTC) or Evolved or enhanced machine-type communication (eMTC) mobile devices. MTC and eMTC mobile devices include, for example, robots, drones, remote devices, sensors, meters, monitors, location tags, etc., that may communicate with a base station, another device (for example, remote device), or some other entity. A wireless node may provide, for example, connectivity for or to a network (for example, a wide area network such as Internet or a cellular network) via a wired or wireless communication link. Some mobile devices may be considered Internet-of-Things (IoT) devices or may be implemented as NB-IoT (narrowband internet of things) devices. A UE 120*a*-120*e* may be included inside a housing that houses components of the UE, such as processor components, memory components, similar components, or a combination thereof.

In general, any number of communication systems and any number of wireless networks may be deployed in a given geographic area. Each communications system and wireless network may support a particular RAT and may operate on one or more frequencies. A RAT also may be referred to as a Radio technology, an air interface, etc. A frequency also may be referred to as a carrier, a frequency channel, etc. Each frequency may support a single RAT in a given geographic area in order to avoid interference between communications systems of different RATs. In some cases, 4G/LTE and/or 5G/NR RAT networks may be deployed. For example, a 5G non-standalone (NSA) network may utilize both 4G/LTE RAT in the 4G/LTE RAN side of the 5G NSA network and 5G/NR RAT in the 5G/NR RAN side of the 5G NSA network. The 4G/LTE RAN and the 5G/NR RAN may both connect to one another and a 4G/LTE core network (e.g., an evolved packet core (EPC) network) in a 5G NSA network. Other example network configurations may include a 5G standalone (SA) network in which a 5G/NR RAN connects to a 5G core network.

In some embodiments, two or more UEs 120*a*-120*e* (for example, illustrated as the UE 120*a* and the UE 120*e*) may communicate directly using one or more sidelink channels 124 (for example, without using a base station 110*a*-110*d* as an intermediary to communicate with one another). For example, UE 120*a*-120*e* may communicate using peer-to-peer (P2P) communications, device-to-device (D2D) communications, a vehicle-to-everything (V2X) protocol (which may include a vehicle-to-vehicle (V2V) protocol, a vehicle-to-infrastructure (V2I) protocol, or similar protocol), a mesh network, or similar networks, or combinations thereof. In this case, the UE 120*a*-120*e* may perform scheduling operations, resource selection operations, as well as other operations described elsewhere herein as being performed by the base station 110*a*.

The UE 120*a*-120*e* may be configured to monitor channel conditions and report the channel conditions to the base station 110*a*-110*d*. For example, a channel condition may be indicated in channel state information (CSI) reported by the UE 120*a*-120*e* to the base station 110*a*-110*d*. CSI reported by the UE 120*a*-120*e* may include a Channel Quality Indicator (CQI) index value indicated in a channel starting frequency (CSF) report sent from the UE 120*a*-120*e* to the base station 110*a*-110*d*. CSI may be reported by the UE 120*a*-120*e* to the base station 110*a*-110*d* physical uplink control channel (PUCCH) or physical uplink scared channel (PUSCH). CQI index values may be observed or estimated channel measurements sent by the UE 120*a*-120*e* to the base station 110*a*-110*d* as an index value to indicate channel quality. CQI index values may be integer values, such as values 0-15, that indicate the quality of the DL channel as observed or estimated by the UE 120*a*-120*e*.

The base station 110*a*-110*d* may be configured to select UEs 120*a*-120*e* to receive broadcast packets based on channel quality estimates, such as based on channel conditions reported by the UEs 120*a*-120*e* in CSI reported by the UEs 120*a*-120*e*. CQI index values may be used by the base station 110*a*-110*d* to determine a Modulation Coding Scheme (MCS) value for a UE 120*a*-120*e*. A base station 110*a*-110*d* may construct an MCS pool containing the union of all MCS values determined from the CSI reports from the UEs 120*a*-120*e* in the cell. During rate control operations the base station 110*a*-110*d* may select a minimum MCS value to cover a percentage of the MCS pool, such as 25%, 50%, 100%, and select UEs 120*a*-120*e* having an MCS at or above the minimum MCS value to receive broadcast packets. Wireless UEs 120*a*-120*e* having an MCS below the minimum MCS value may not be selected to receive broadcast packets.

Figure 2:
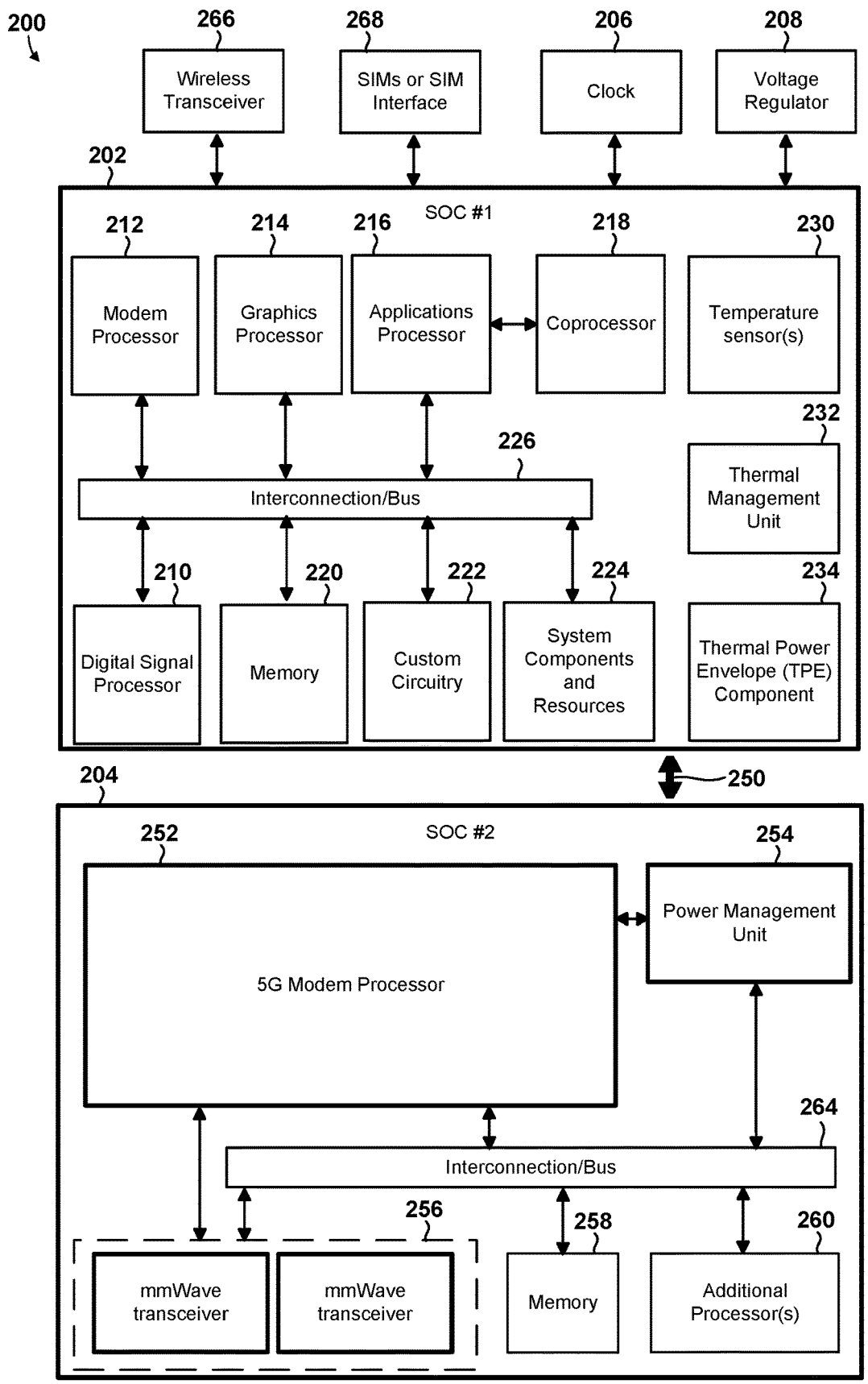
FIG. 2 is a component block diagram illustrating an example computing and wireless modem system suitable for implementing any of the various embodiments.

FIG. 2 is a component block diagram illustrating an example computing and wireless modem system 200 suitable for implementing any of the various embodiments in UEs and/or base stations. Various embodiments may be implemented on a number of single processor and multi-processor computer systems, including an SOC or system in a package.

With reference to FIGS. 1 and 2, the illustrated example wireless modem system 200 (which may be a system-in-a-package in some embodiments) includes a two SOCs 202, 204 coupled to a clock 206, a voltage regulator 208, at least one SIM 268 and/or a SIM interface and a wireless transceiver 266 configured to send and receive wireless communications via an antenna (not shown) to/from network UEs, such as a base station 110*a*. In some embodiments, the first SOC 202 operate as central processing unit (CPU) of the UE that carries out the instructions of software application programs by performing the arithmetic, logical, control and input/output (I/O) operations specified by the instructions. In some embodiments, the second SOC 204 may operate as a specialized processing unit. For example, the second SOC 204 may operate as a specialized 5G processing unit responsible for managing high volume, high speed (e.g., 5 Gbps, etc.), and/or very high frequency short wave length (e.g., 28 GHz mmWave spectrum, etc.) communications.

The first SOC 202 may include a digital signal processor (DSP) 210, a modem processor 212, a graphics processor 214, an application processor (AP) 216, one or more coprocessors 218 (e.g., vector co-processor) connected to one or more of the processors, memory 220, custom circuitry 222, system components and resources 224, an interconnection/bus module 226, one or more temperature sensors 230, a thermal management unit 232, and a thermal power envelope (TPE) component 234. The second SOC 204 may include a 5G modem processor 252, a power management unit 254, an interconnection/bus module 264, the plurality of mmWave transceivers 256, memory 258, and various additional processors 260, such as an applications processor, packet processor, etc.

Each processor 210, 212, 214, 216, 218, 252, 260 may include one or more cores, and each processor/core may perform operations independent of the other processors/cores. For example, the first SOC 202 may include a processor that executes a first type of operating system (e.g., FreeBSD, LINUX, OS X, etc.) and a processor that executes a second type of operating system (e.g., MICROSOFT WINDOWS 10). In addition, any or all of the processors 210, 212, 214, 216, 218, 252, 260 may be included as part of a processor cluster architecture (e.g., a synchronous processor cluster architecture, an asynchronous or heterogeneous processor cluster architecture, etc.).

The first and second SOC 202, 204 may include various system components, resources and custom circuitry for managing sensor data, analog-to-digital conversions, wireless data transmissions, and for performing other specialized operations, such as decoding data packets and processing encoded audio and video signals for rendering in a web browser. For example, the system components and resources 224 of the first SOC 202 may include power amplifiers, voltage regulators, oscillators, phase-locked loops, peripheral bridges, data controllers, memory controllers, system controllers, access ports, timers, and other similar components used to support the processors and software clients running on a UE. The system components and resources 224 and/or custom circuitry 222 may also include circuitry to interface with peripheral devices, such as cameras, electronic displays, wireless communication devices, external memory chips, etc.

The first and second SOC 202, 204 may communicate via interconnection/bus module 250. The various processors 210, 212, 214, 216, 218, may be interconnected to one or more memory elements 220, system components and resources 224, and custom circuitry 222, and a thermal management unit 232 via an interconnection/bus module 226. Similarly, the processor 252 may be interconnected to the power management unit 254, the mmWave transceivers 256, memory 258, and various additional processors 260 via the interconnection/bus module 264. The interconnection/bus module 226, 250, 264 may include an array of reconfigurable logic gates and/or implement a bus architecture (e.g., CoreConnect, AMBA, etc.). Communications may be provided by advanced interconnects, such as high-performance networks-on chip (NoCs).

The first and/or second SOCs 202, 204 may further include an input/output module (not illustrated) for communicating with resources external to the SOC, such as a clock 206, a voltage regulator 208, one or more wireless transceivers 266, and at least one SIM 268 and/or SIM interface (i.e., an interface for receiving one or more SIM cards). Resources external to the SOC (e.g., clock 206, voltage regulator 208) may be shared by two or more of the internal SOC processors/cores. The at least one SIM 268 (or one or more SIM cards coupled to one or more SIM interfaces) may store information supporting multiple subscriptions, including a first 5GNR subscription and a second 5GNR subscription, etc.

In addition to the example system-in-a-package 200 discussed above, various embodiments may be implemented in a wide variety of computing systems, which may include a single processor, multiple processors, multicore processors, or any combination thereof.

Figure 3:
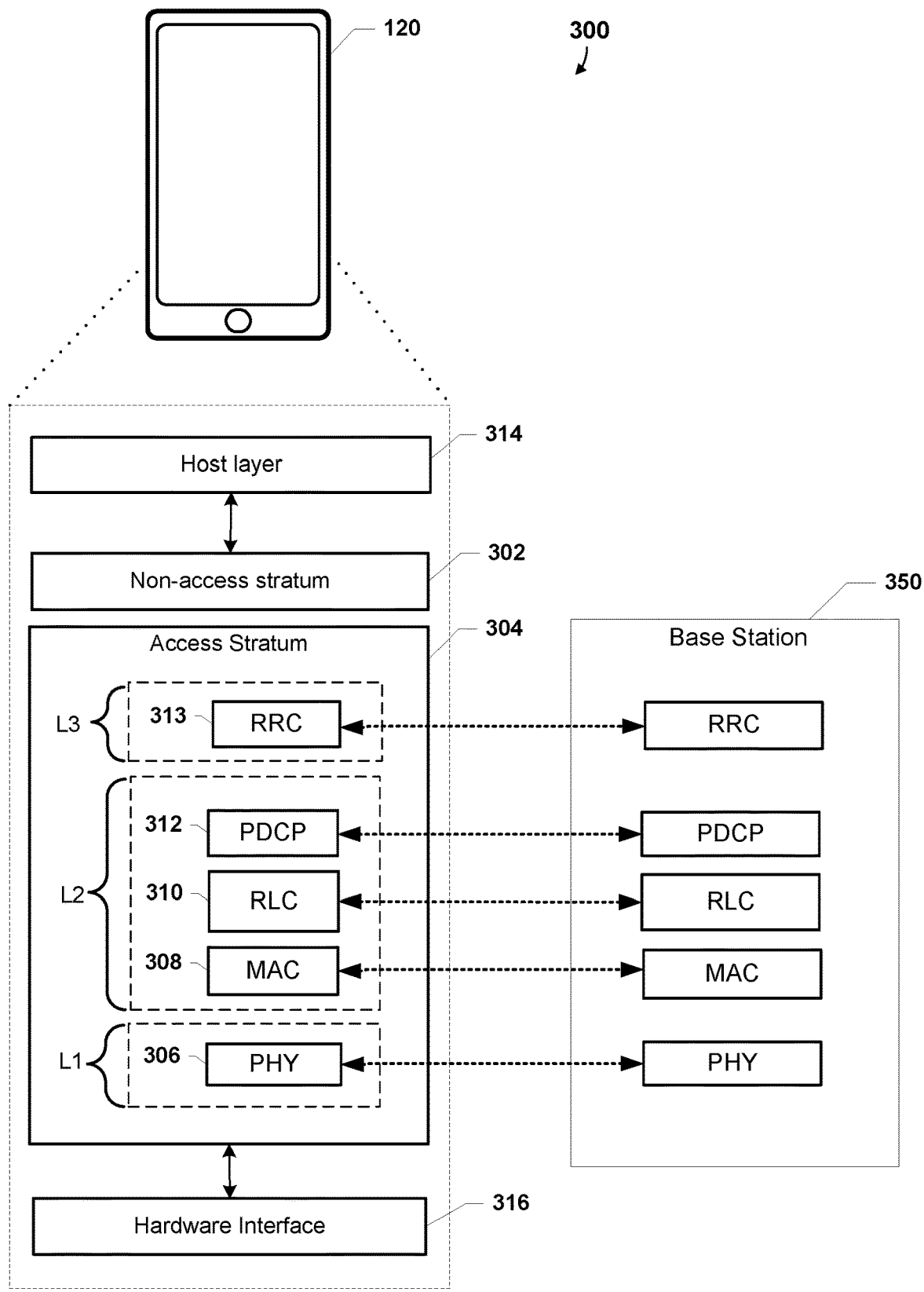
FIG. 3 is a component block diagram illustrating a software architecture including a radio protocol stack for the user and control planes in wireless communications suitable for implementing any of the various embodiments.

FIG. 3 is a component block diagram illustrating a software architecture 300 including a radio protocol stack for the user and control planes in wireless communications suitable for implementing any of the various embodiments. With reference to FIGS. 1-3, the UE 120 may implement the software architecture 300 to facilitate communication between a UE 120 (e.g., the UE 120a-120e, 200) and the base station 350 (e.g., the base station 110a-d) of a communication system (e.g., 100). In some embodiments, layers in software architecture 300 may form logical connections with corresponding layers in software of the base station 350. The software architecture 300 may be distributed among one or more processors (e.g., the processors 212, 214, 216, 218, 252, 260). While illustrated with respect to one radio protocol stack, in a multi-SIM (subscriber identity module) UE, the software architecture 300 may include multiple protocol stacks, each of which may be associated with a different SIM (e.g., two protocol stacks associated with two SIMs, respectively, in a dual-SIM wireless communication device). While described below with reference to LTE communication layers, the software architecture 300 may support any of variety of standards and protocols for wireless communications, and/or may include additional protocol stacks that support any of variety of standards and protocols wireless communications.

The software architecture 300 may include a Non-Access Stratum (NAS) 302 and an Access Stratum (AS) 304. The NAS 302 may include functions and protocols to support Packet filtering, security management, mobility control, session management, and traffic and signaling between a SIM(s) of the UE and its core network 140. The AS 304 may include functions and protocols that support communication between a SIM(s) and entities of supported access networks (e.g., a base station). In particular, the AS 304 may include at least three layers (Layer 1, Layer 2, and Layer 3), each of which may contain various sub-layers.

In the user and control planes, Layer 1 (L1) of the AS 304 may be a physical layer (PHY) 306, which may oversee functions that enable transmission and/or reception over the air interface. Examples of such physical layer 306 functions may include cyclic redundancy check (CRC) attachment, coding blocks, scrambling and descrambling, modulation and demodulation, signal measurements, MIMO, etc. The PHY layer 306 may include various logical channels, including the Physical Downlink Control Channel (PDCCH) and the Physical Downlink Shared Channel (PDSCH). As an example, the PHY layer 306 may support CSI measurements and reporting (e.g., CQI measurements and reporting).

In the user and control planes, Layer 2 (L2) of the AS 304 may be responsible for the link between the UE 120 and the base station 350 over the physical layer 306. In the various embodiments, Layer 2 may include a Media Access Control (MAC) sublayer 308, a Radio link Control (RLC) sublayer 310, and a Packet data convergence protocol (PDCP) 312 sublayer, each of which form logical connections terminating at the base station 350.

In the control plane, Layer 3 (L3) of the AS 304 may include an RRC sublayer 3. While not shown, the software architecture 300 may include additional Layer 3 sublayers, as well as various upper layers above Layer 3. In various embodiments, the RRC sublayer 313 may provide functions including broadcasting system information, paging, and establishing and releasing an RRC signaling connection between the UE 120 and the base station 350.

In various embodiments, the PDCP sublayer 312 may provide uplink functions including multiplexing between different Radio bearers and logical channels, sequence number addition, handover data handling, integrity protection, ciphering, and header compression. In the downlink, the PDCP sublayer 312 may provide functions that include in-sequence delivery of data packets, duplicate data Packet detection, integrity validation, deciphering, and header decompression.

In the uplink, the RLC sublayer 310 may provide segmentation and concatenation of upper layer data packets, retransmission of lost data packets, and Automatic Repeat Request (ARQ). In the downlink, while the RLC sublayer 310 functions may include reordering of data packets to compensate for out-of-order reception, reassembly of upper layer data packets, and ARQ.

In the uplink, MAC sublayer 308 may provide functions including multiplexing between logical and transport channels, random access procedure, logical channel priority, and hybrid-ARQ (HARQ) operations. In the downlink, the MAC layer functions may include channel mapping within a cell, de-multiplexing, discontinuous reception (DRX), and HARQ operations.

While the software architecture 300 may provide functions to transmit data through physical media, the software architecture 300 may further include at least one host layer 314 to provide data transfer services to various applications in the UE 120. In some embodiments, application-specific functions provided by the at least one host layer 314 may provide an interface between the software architecture and the general purpose processor.

In other embodiments, the software architecture 300 may include one or more higher logical layer (e.g., transport, session, presentation, application, etc.) that provide host layer functions. In some embodiments, the software architecture 300 may include an application layer in which a logical connection terminates at another device (e.g., end user device, server, etc.). In some embodiments, the software architecture 300 may further include in the AS 304 a hardware interface 316 between the physical layer 306 and the communication hardware (e.g., one or more radio frequency (RF) transceivers).

Figure 4A:
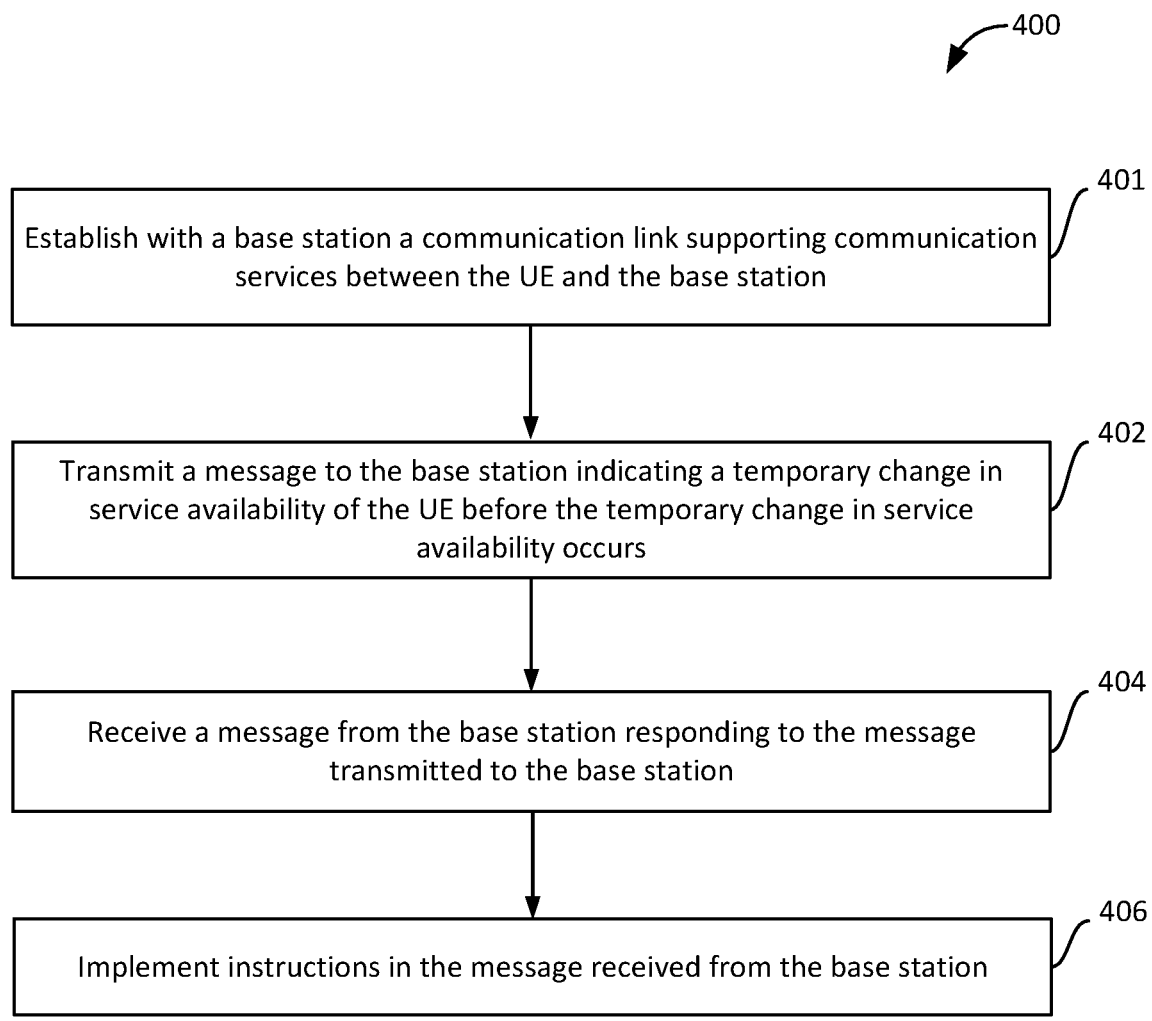
FIG. 4A is a process flow diagram illustrating a method 400 that may be performed by a UE in accordance with various embodiments.
Figure 4B:
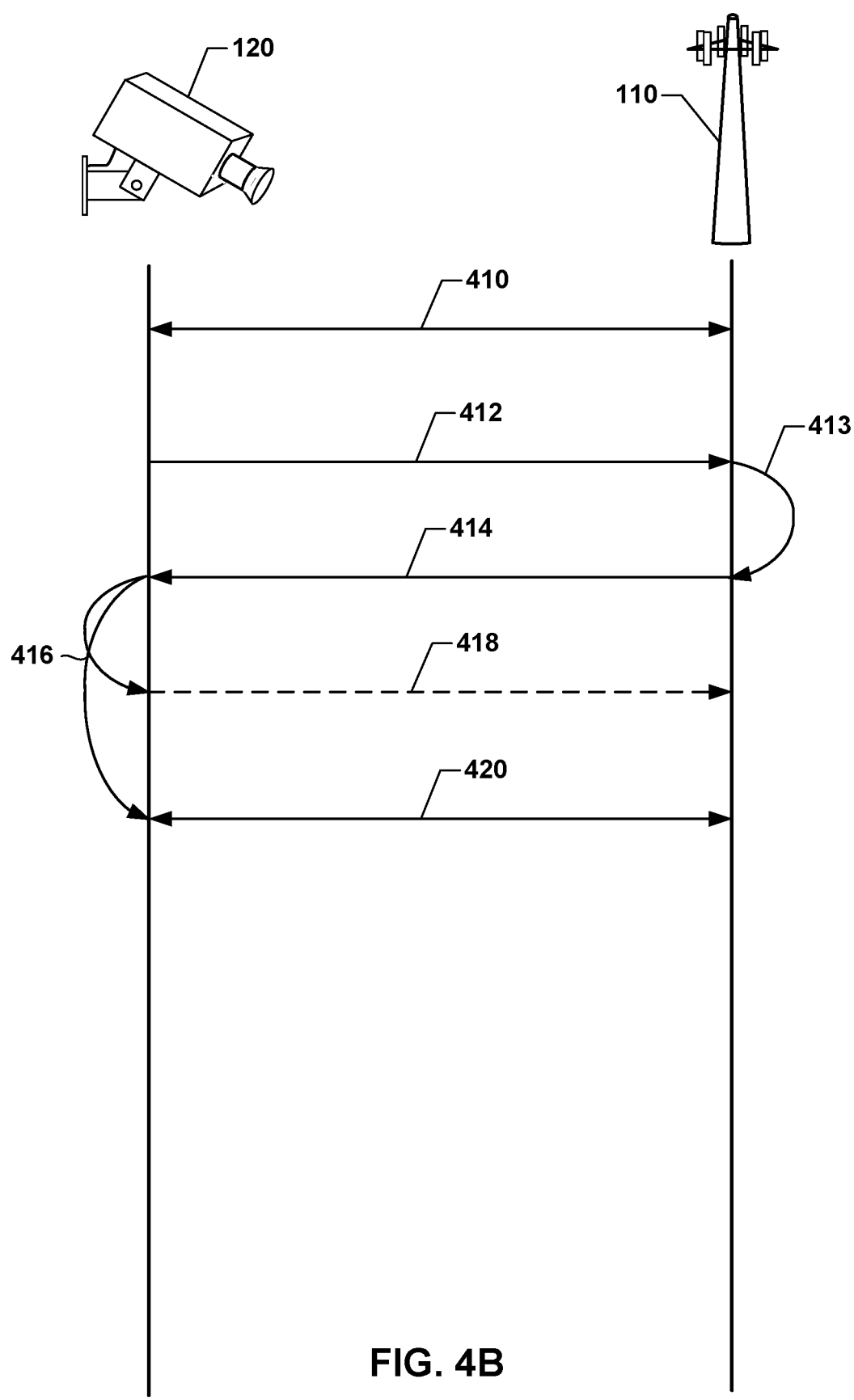
FIG. 4B is a message flow diagram illustrating messages exchanged between a UE and a base station in accordance with various embodiments.

FIG. 4A illustrates a method 400 that may be performed by a processor of a wireless UE for signaling a base station regarding a temporary change in service availability according to various embodiments. FIG. 4B illustrates messages that may be exchanged between the UE and the base station With reference to FIGS. 1-4B, the method 400 may be implemented in hardware components and/or software components of a wireless UE 120 (e.g., the wireless UE 120a-120e, 200), the operation of which may be controlled by one or more processors (e.g., the processors 212, 214, 216, 218, 252, and 260) of the wireless UE.

Referring to FIGS. 4A and 4B, a UE 120 may establish with a base station 110 a communication link supporting communication services between the UE and the base station in block 401, such as by camping on a base station 110 and exchanging signals 410 for establishing and maintaining the communication link and exchanging data messages associated with communication services between the UE 120 and the base station 110.

In block 402, the processor may transmit a message 412 to the base station 110 indicating a temporary change in service availability of the UE before the temporary change in service availability occurs. The UE processor may be configured to recognize from operating conditions when a temporary change in service availability will occur, such as when the UE is going to change position, experience a power outage, turn in an orientation that may block signals to the base station, etc. In some implementations, the processor may be configured with a schedule or periodicity of temporary changes in service availability, such as in settings or parameters stored in memory when the UE is installed. For example, a security camera that is configured to change orientations periodically may be programmed with a schedule or periodicity of temporary signal interruptions with the base station, information that the processor may transmit in message 412 to the base station in block 402. A temporary change in service availability of the UE may occur for a variety of reasons. Some examples of which include the temporary changes in service availability that may be indicated in the message from the UE may range from an inability to receive messages from and/or transmit messages to the base station (e.g., due to movements of the UE, temporary interruption or blockage of wireless signals to/from the UE, temporary interruption of power to the UE or the UE transceiver, etc.), temporary interruption of a particular beam conductivity, temporary inability to perform certain functions related to service availability, temporary interruptions of downlink or uplink scheduled or shared channels, temporary inability to respond to certain message exchanges with the base station, and the like. Any know messaging format and communication channel may be used by the UE for sending the message 412 regarding the temporary change in service availability, such as paging messages, MAC-CE, RRC, etc. Means for performing functions of the operations in block 402 may include the processor (e.g., 212, 214, 216, 218, 252, and 260) coupled to a wireless transceiver (e.g., 266).

In some embodiments, the operations in block 402 may include transmitting a message 412 indicating an immediate change in service availability. For example, if the UE detects that some portion of the device is overheating (i.e., a detective temperature exceeds a temperature threshold), the processor may take corrective actions which may involve reducing some communication activities in order to reduce heating and internal temperatures, in which case the processor may transmit a message 412 to the base station in block 402 indicating changes in service availability that are being implemented. Reducing some communication activities may result in a rapid decrease in temperature such that the UE returns to acceptable operating temperatures, and thus the change in service availability may be temporary, and when temperature conditions permit returning to full service availability the processor may transmit a second message to the base station requesting resumption of full-service activities.

In some implementations, the processor may have information enabling it to anticipate when a future disruption in service availability will occur. For example, the UE may be scheduled to be shut down at certain times of the day, such as at night. Thus, in some embodiments, the processor may transmit a message 412 to the base station in block 402 indicating that future time when the change in service availability will occur.

In some implementations, the UE may be subject to regular, scheduled or periodic interruptions to signal transmission or changes in service availability. For example, a surveillance camera UE 120 that periodically rotates to different viewing angles may experience changes in service availability while rotating and/or at each viewing orientation. Such rotations may occur on a regular schedule or periodicity; thus, the processor can determine a time schedule of temporary changes in service availability of the UE, and include the time schedule in the message 412 transmitted to the base station as part of the operations in block 402. In some embodiments, the processor may transmit a message 412 to the base station in block 402 that indicates both the future time and the duration when the UE will experience the temporary change in service availability.

In some implementations, the change in service availability may involve a change in the operations that the UE will be able to perform. For example, the processor may have information to determine that the UE will not be able to receive downlink communications but will still be able to receive uplink configured grant communications during the temporary change in service availability. In some implementations, the UE may be incapable of either uplink or downlink data transfers but may still be able to perform some network maintenance operations, such as signal strength monitoring, and/or semi-persistent scheduling (SPS). In some implementations, the UE may not be able to perform one or more of BFD or BFR procedures, radio link monitoring (RLM), radio resource monitoring (RRM), CSI reporting, page monitoring, etc. In some situations, the UE may be completely out of coverage or service and thus not able to perform any of procedures. Thus, in the message 412 sent to the base station in block 402, the processor may include information regarding the nature of the temporary change in service availability including processes and procedures that will not be performed during that time.

On the other hand, in some implementations, the processor may be able to identify processes or procedures that will be performed during the temporary change in service availability, and include such information in the message 412 sent to the base station in block 402. For example, the processor may include in the message 412 information regarding particular processes that will continue to be performed during the temporary change in service availability, which may be in addition to identifying the processes or procedures that will not be performed during that time. Informing the base station of the processes and procedures that will not be performed during the temporary change in service availability may enable the base station to anticipate reporting that will not be received and avoid processes or procedures that will not be responded to by the UE.

In a further embodiment, the message 412 transmitted to the base station in block 402 may also request information, services or procedures from the base station that the UE should implement after the temporary change in service availability is over. For example, the UE may request information to be used to reestablish full communication services with the base station.

In block 404, the processor may receive a message 414 from the base station 110 responding to the message 412 regarding the temporary change in service availability that was transmitted to the base station. In some situations, the message 414 from the base station may simply acknowledge the message 412 from the UE. Means for performing functions of the operations in block 404 may include the processor (e.g., 212, 214, 216, 218, 252, and 260) coupled to a wireless transceiver (e.g., 266). Informing the base station of the processes or procedures that will be performed during the temporary change in service availability may enable the base station to plan for receiving reports from identified processes as well as limit interactions with the UE to procedures to which the UE will respond.

In block 406, the processor may perform operations 416 to implement the instructions that were included in the message received from the base station (if any). For example, in the operation 416 the processor may implement the indicated temporary change in service availability in response to the message received from the base station acknowledging or approving the temporary change in service availability. As another example, in the operation 416 the processor may implement service settings, parameters or procedures related to the temporary change in service availability indicated in the message received from the base station. As a further example, in the operation 416 the processor may attempt to maintain service with the base station in response to the message received from the base station rejecting the temporary change in service availability. In some embodiments, the UE may receive information from the base station for one or more procedures to be implemented by the UE during the temporary change in service availability in block 404, and implement the indicated one or more procedures in the operation 416 during the temporary change in service availability in block 406. In some embodiments, the UE may receive information for one or more procedures to be implemented by the UE after the temporary change in service availability in block 404, and implement the indicated one or more procedures in the operation 416 upon resuming service following the temporary change in service availability in block 406. Means for performing functions of the operations in block 406 may include the processor (e.g., 212, 214, 216, 218, 252, and 260) and a wireless transceiver (e.g., 256, 266).

Figure 5A:
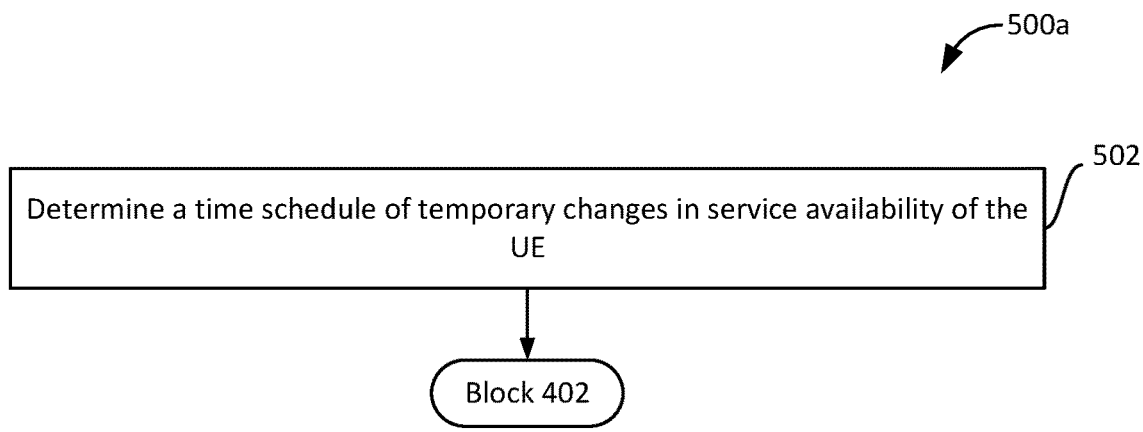
FIGS. 5A-5C are process flow diagram illustrating additional or alternative operations for the method 400 according to some embodiments.
Figure 5B:
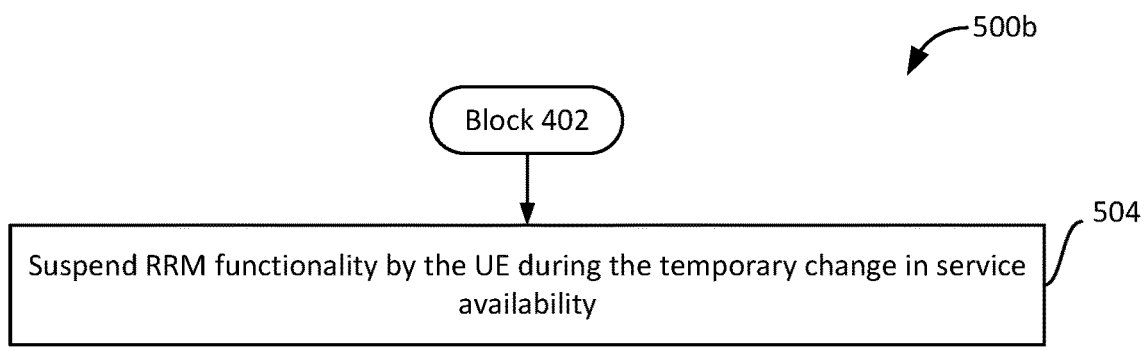
Figure 5C:
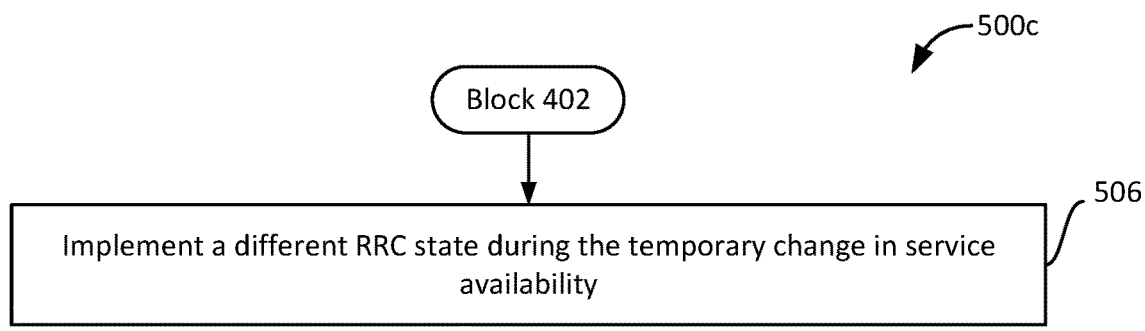

FIGS. 5A-5C illustrate operations 500a-500c that may be performed by a processor of a wireless UE 120 as part of the method 400 for in forming a base station regarding temporary changes in service availability as well as implementing commands or instructions received from the base station according to various embodiments. With reference to FIGS. 1-5C, the operations 500a-500c may be implemented in hardware components and/or software components of a wireless UE 120 (e.g., the wireless device 120a-120e, 200), the operation of which may be controlled by one or more processors (e.g., the processors 212, 214, 216, 218, 252, and 260) of the wireless UE.

Referring to FIG. 5A and FIG. 4B, in block 502, the processor may determine a time schedule of temporary changes in service availability of the UE. For example, when the UE is deployed in an application or location that will experience regular or periodic interruptions in service of other temporary changes in service availability, the processor may generate a schedule of such changes in a format that is usable by the base station and that can be transmitted to the base station in block 402 in the message 412. Means for performing functions of the operations in block 502 may include the processor (e.g., 212, 214, 216, 218, 252, and 260) and the wireless transceiver (e.g., 256, 266).

The processor may then perform the operations of block 402 of the method 400 as described.

Referring to FIG. 5B, following the performance of the operations of block 402 of the method 400, the processor may suspend RRM functionality by the UE during the temporary change in service availability in block 504. Means for performing functions of the operations in determination block 506 may include the processor (e.g., 212, 214, 216, 218, 252, and 260) and the wireless transceiver (e.g., 256, 266).

Referring to FIG. 5C, following the performance of the operations of block 402 (FIG. 4), the processor may implement a different RRC state in block 506. For example, the processor may enter an idle RRC state, an inactive RRC state, or another RRC state. Means for performing functions of the operations in determination block 506 may include the processor (e.g., 212, 214, 216, 218, 252, and 260).

Figure 6:
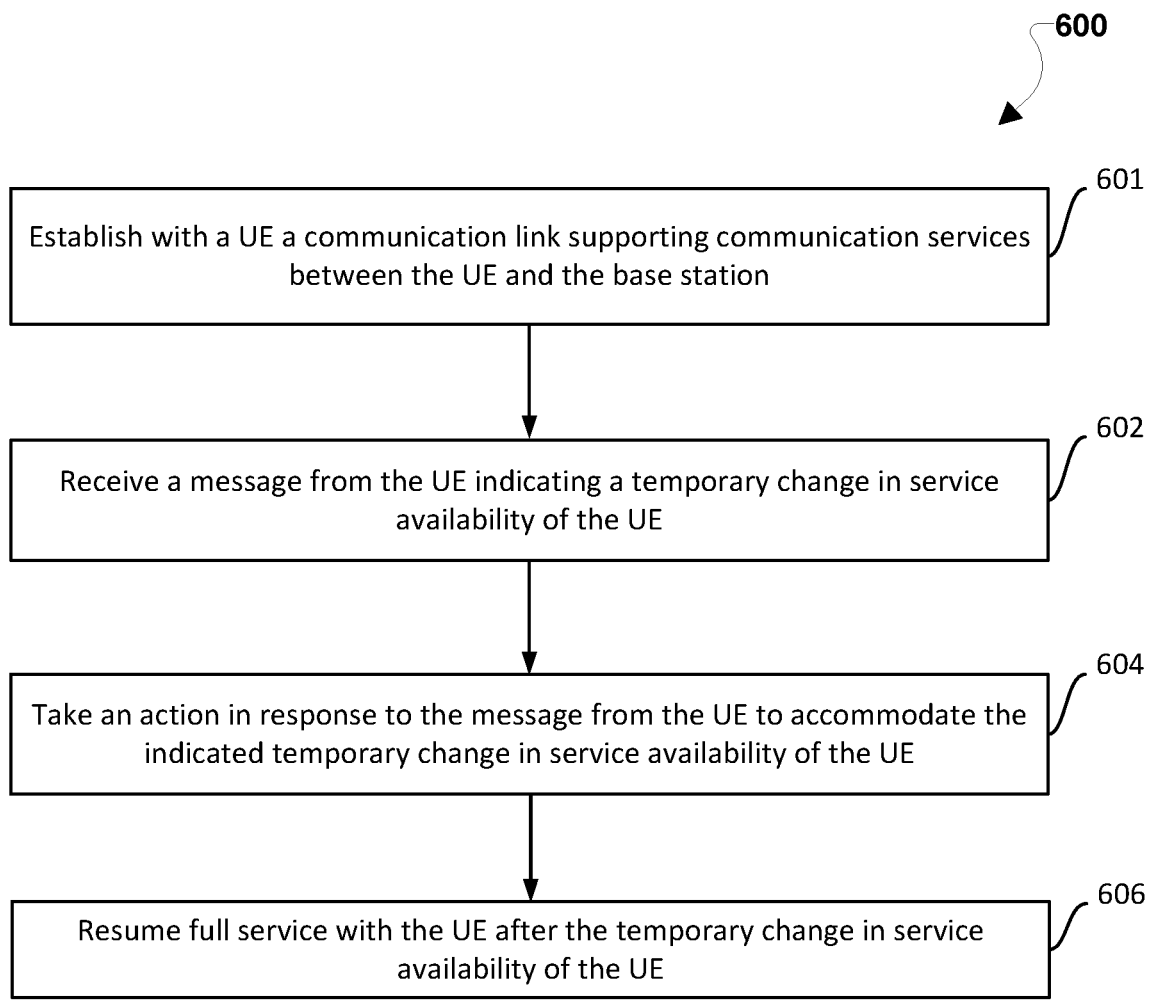
FIG. 6 is a process flow diagram illustrating a method that may be performed by base station in accordance with various embodiments.

FIG. 6 illustrates a method 600 that may be performed by a processor of a base station 110 in response to signaling from a UE 120 regarding a temporary change in service availability by the UE according to various embodiments. Again, FIG. 4B illustrates messages that may be exchanged between the UE 120 and the base station 110. With reference to FIGS. 1-6, the method 600 may be implemented in hardware components and/or software components of a base station (e.g., 110a-110d, 350), the operation of which may be controlled by one or more processors (e.g., 212, 214, 216, 218, 252, and 260) of the base station.

Referring to FIGS. 6 and 4B, in block 601, the base station processor may establish with a UE 120 a communication link supporting communication services between the UE and the base station, including exchanging signals 410 for establishing and maintaining the communication link and exchanging data messages associated with communication services between the UE 120 and the base station 110.

In block 602, the processor may receive a message 412 from the UE indicating a temporary change in service of the UE. As described above, the message 412 received from the UE may identify an immediate temporary change in service availability, an anticipated or future temporary change in service availability, a future time and duration of a temporary change in service availability, and/or a schedule or periodicity of temporary changes in service availability. Also as described above, the temporary changes in service availability that may be indicated in the message 412 from the UE may range from an inability to receive messages from and/or transmit messages to the base station (e.g., due to movements of the UE, temporary interruption or blockage of wireless signals to/from the UE, temporary interruption of power to the UE or the UE transceiver, etc.), temporary interruption of a particular beam conductivity, temporary inability to perform certain functions related to service availability, temporary interruptions of downlink or uplink scheduled or shared channels, temporary inability to respond to certain message exchanges with the base station, and the like. Means for performing functions of the operations in block 602 may include the processor (e.g., 212, 214, 216, 218, 252, and 260) coupled to a wireless transceiver (e.g., 266).

In response to receiving the message 412 from the UE, the processor may take an action to accommodate the indicated temporary change in service availability of the UE in block 604. In some embodiments and situations, the base station may transmit a message 416 to the UE acknowledging or accepting the temporary change in service availability. In some embodiments and situations, the base station may simply not interpret the temporary change in service availability of the UE as an indication of an out of service situation, and thus avoid declaring the UE is being out of service. Means for performing the functions in block 604 may include the processor (e.g., 212, 214, 216, 218, 252, and 260) coupled to a wireless transceiver (e.g., 266).

In some embodiments, the action taken by the base station in block 604 may depend upon the information included in the message 412 from the UE. In some embodiments, if the message received from the UE indicates an immediate change in service availability, the action taken by the base station may include maintaining a link with the UE during the immediate change in service availability. In some embodiments, if the message 412 received from the UE indicates a future time when the change in service availability of the UE will occur, the base station may take an action in response that includes scheduling communications to the UE and maintaining a link with the UE during the indicated future time when the change in service availability of occurs. In some embodiments, if the message 412 received from the UE includes a time schedule when changes in service availability of the UE will occur, the base station may take an action in response that includes scheduling communications to the UE and maintaining the link with the UE during periods of changed UE service availability identified in the time schedule. In some embodiments, if the message 412 received from the UE indicates a time and duration when the UE will experience the temporary change in service availability, the base station may take an action in response that includes maintaining a link with the UE at the indicated time and for the indicated duration while communications with the UE are not possible. In some embodiments, if the message 412 received from the UE indicates one or more services or procedures that the UE will not be able to perform during the temporary change in service availability, the base station may take an action in response that includes avoiding requesting or expecting the indicated one or more services or procedures that the UE will not be able to perform and maintaining a link with the UE during the temporary change in service availability. In some embodiments, if the message 412 received from the UE indicates one or more services or procedures that the UE will be able to perform during the temporary change in service availability, the base station may take an action in response that includes limiting interactions with the UE to the indicated one or more services or procedures that the UE will be able to perform during the temporary change in service availability.

In block 606, the processor may resume full service 420 with the UE after the temporary change in service availability of the UE. By avoiding declaring the UE is out of service and breaking the communication link with the UE, the base station may reestablish full communication services 420 with the UE after the temporary change in service availability has ended, without the signaling and delay associated with reestablishing a new communication link with the UE. In some embodiments, the base station may receive a message 418 from the UE requesting resumption of service following the change of service availability, in which case, the base station may immediately resume full service 420 with the UE. In embodiments and situations in which the UE has informed the base station of a duration or time when the temporary change in service availability will end, the base station may resume full service 420 with the UE at that indicated time. In embodiments and situations in which the UE message 412 indicates a schedule or periodicity of temporary changes in service availability, the base station may schedule operations to resume full service with the UE at the scheduled or indicated times when the UE will be capable of full service availability. Means for performing functions of the operations in block 606 may include the processor (e.g., 212, 214, 216, 218, 252, and 260) and a wireless transceiver (e.g., 256, 266).

In some embodiments and circumstances, the base station may make a determination in operations 413 regarding the UE and the temporary change in service availability, and take action based upon that determination. For example, in various embodiments, the base station may accept and respond to the indicated temporary change in service availability of the UE as indicated without modification, may determine in operations 413 that some modifications to the indicated changes in service availability should be implemented by the UE, or determine that the UE should not go out of service (i.e., reject the temporary change in service availability). FIGS. 7A-7D illustrate operations 700*a*-700*d* that may be performed by a processor of a base station as part of the method 600 in response to receiving information from a UE regarding temporary changes in service availability according to various embodiments. With reference to FIGS. 1-7D, the operations 700*a*-700*d* may be implemented in hardware components and/or software components of a base station (e.g., 110*a*-110*d*, 350), the operation of which may be controlled by one or more processors (e.g., the processors 212, 214, 216, 218, 252, and 260) of the base station.

Figure 7A:
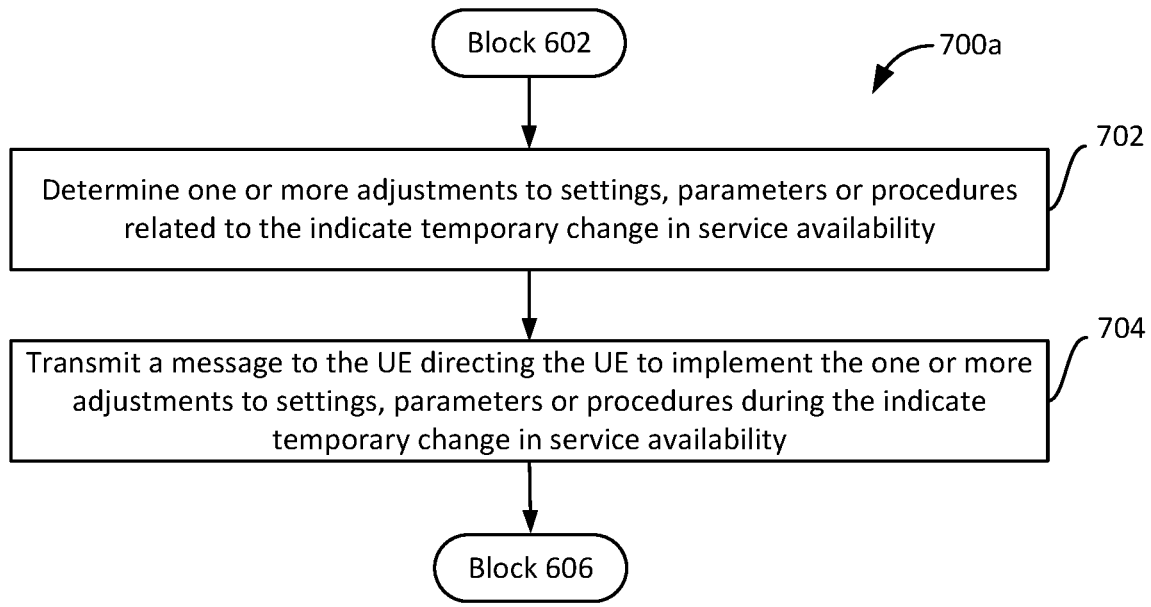
FIGS. 7A-7D are process flow diagram illustrating additional or alternative operations for the method 600 according to some embodiments.

Referring to FIG. 7A and FIG. 4B, following performance of the operations in block 602 of the method 600, the processor may determine one or more adjustments to settings, parameters or procedures related to the indicated temporary change in service availability in block 702 (illustrated as operations 413 in FIG. 4B). For example, the processor may determine changes in UE operating parameters such as a change in the radio resource management (RRM) settings, total power control (TPC) state, an uplink timing advance, and the like. As a further example, in operations 413 the processor may determine changes to the beam failure detection (BFD) or beam failure recovery reference signal (BFR RS) that should be indicated to the UE. Means for performing functions of the operations in block 702 may include the processor (e.g., 212, 214, 216, 218, 252, and 260).

In block 704, the processor may transmit a message to the UE providing the determined information and/or directing the UE to implement the determined one or more adjustments to settings, parameters or procedures during the indicated temporary change in service availability. As a nonlimiting examples, the base station may transmit information or instruction to the UE via an RRC, MAC-CE or DCI over a command channel, such as a PDCCH or PDSCH. Means for performing functions of the operations in block 704 may include the processor (e.g., 212, 214, 216, 218, 252, and 260) coupled to a wireless transceiver (e.g., 266).

The processor may then perform the operations of block 606 of the method 600 as described.

Figure 7B:
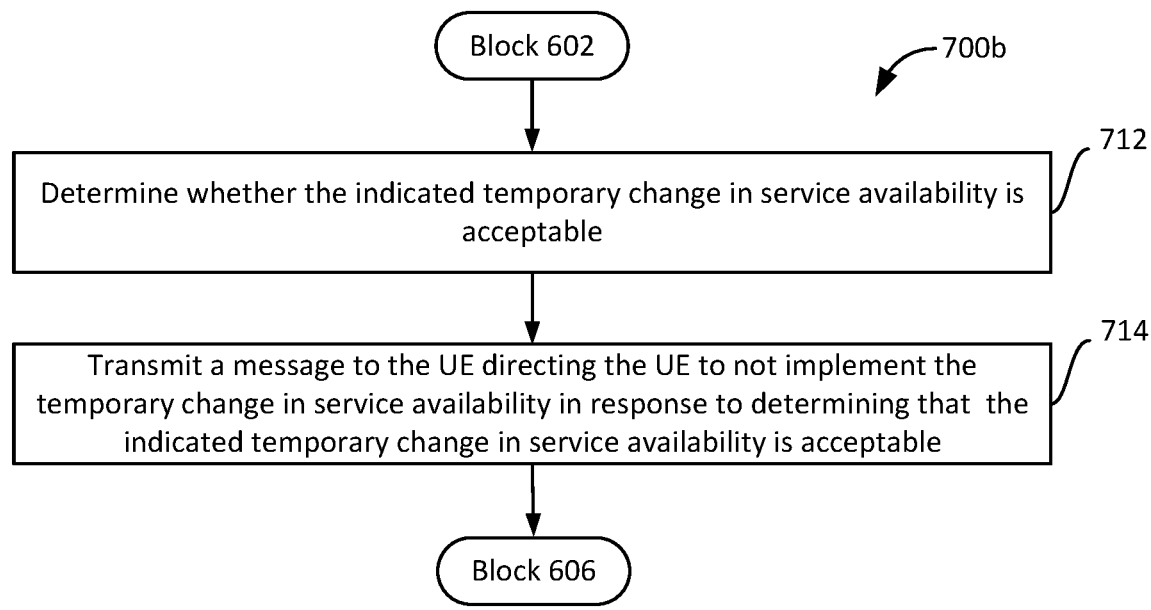

Referring to FIG. 7B and FIG. 4B, following performance of the operations of block 602 of the method 600, in operations 413 the processor may determine whether the indicated temporary change in service availability is acceptable in block 712. For example, the base station may have information that downlink messages will be transmitted and determine that the UE needs to be scheduled to receive the messages. As another example, in operations 413 the base station may be processing messages for delivery to the UE and determine that the UE needs to monitor for associated paging. As a further example, in operations 413 the base station may determine that the network is about to transmit management procedures to the UE. Means for performing functions of the operations in determination block 712 may include the processor (e.g., 212, 214, 216, 218, 252, and 260).

In block 714, the processor may transmit a message 414 to the UE directing the UE to not implement temporary change in service availability. As nonlimiting examples, the base station may transmit such information or instruction to the UE via an RRC, MAC-CE or DCI over a command channel, such as a PDCCH or PDSCH. Means for performing functions of the operations in block 702 may include the processor (e.g., 212, 214, 216, 218, 252, and 260) coupled to a wireless transceiver (e.g., 266).

The processor may then perform the operations of block 606 of the method 600 to resume full service 423 as described.

Figure 7C:
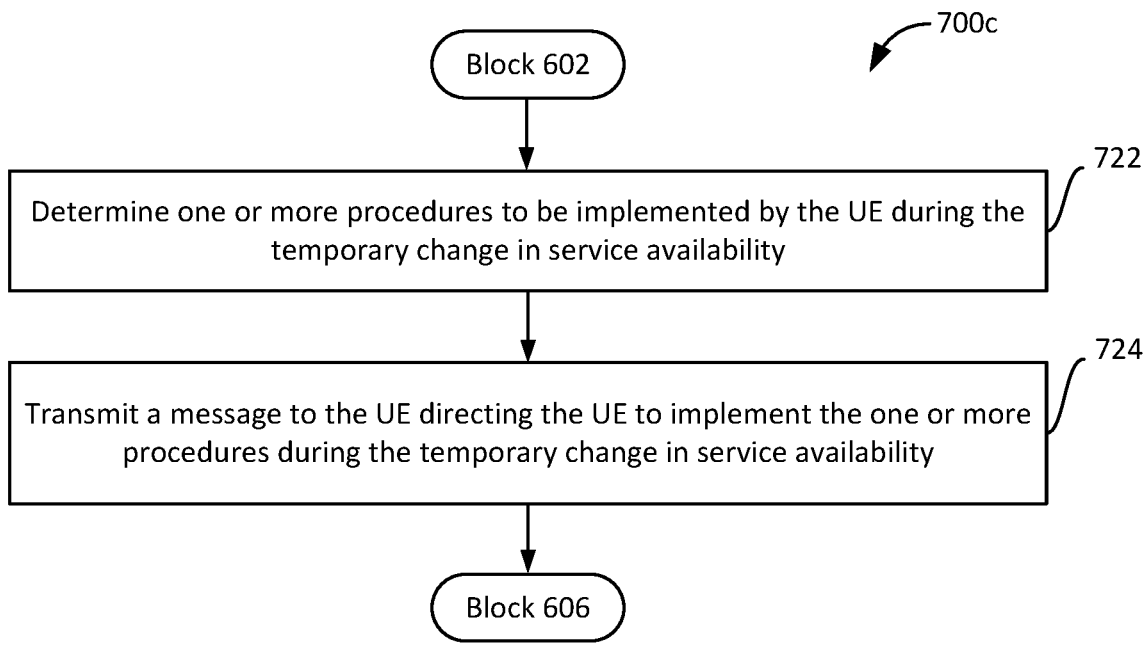

Referring to FIGS. 7C and 4B, following the performance of the operations of block 602 the method 600, in operations 413 the processor may determine one or more procedures to be implemented by the UE during the temporary change in service availability in block 722. For example, the base station processor may determine that the UE should perform RRM, RLM, BFD, and/or BFR procedures, monitor for pages, and other similar procedures. Means for performing functions of the operations in determination block 712 may include the processor (e.g., 212, 214, 216, 218, 252, and 260).

In block 724, the processor may transmit a message 414 to the UE directing the UE to implement the one or more procedures during the temporary change in service availability. As nonlimiting examples, the base station may transmit such information or instruction to the UE via an RRC, MAC-CE or DCI over a command channel, such as a PDCCH or PDSCH. Means for performing functions of the operations in block 724 may include the processor (e.g., 212, 214, 216, 218, 252, and 260) coupled to a wireless transceiver (e.g., 256, 266).

The processor may then perform the operations of block 606 of the method 600 to resume full service 423 as described.

Figure 7D:
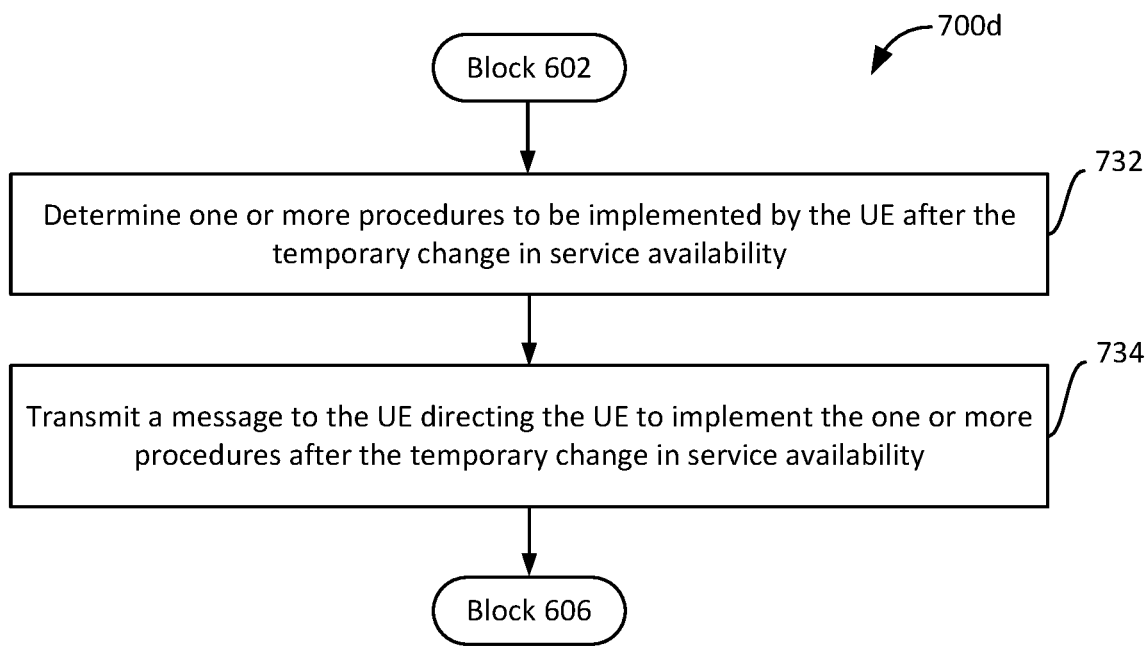

Referring to FIGS. 7D and 4B, following the performance of the operations of block 602 of the method 600, in operations 413 the processor may determine one or more procedures to be implemented by the UE after the temporary change in service availability in block 732. For example, the processor may determine processes that the UE can implement after the change in service availability in order to reestablish full services with the base station. As another example, the processor may determine contention free random access channel preamble (PRACH) resources that the UE can use for accessing the network following the temporary change in service billability. Means for performing functions of the operations in determination block 732 may include the processor (e.g., 212, 214, 216, 218, 252, and 260).

In block 734, the processor may transmit a message 414 to the UE directing the UE to implement the one or more procedures after the temporary change in service availability. As nonlimiting examples, the base station may transmit such information or instruction to the UE via an RRC, MAC-CE or DCI over a command channel, such as a PDCCH or PDSCH. Means for performing functions of the operations in block 734 may include the processor (e.g., 212, 214, 216, 218, 252, and 260) coupled to a wireless transceiver (e.g., 256, 266).

The processor may then perform the operations of block 606 of the method 600 to resume full service 423 as described.

Figure 8:
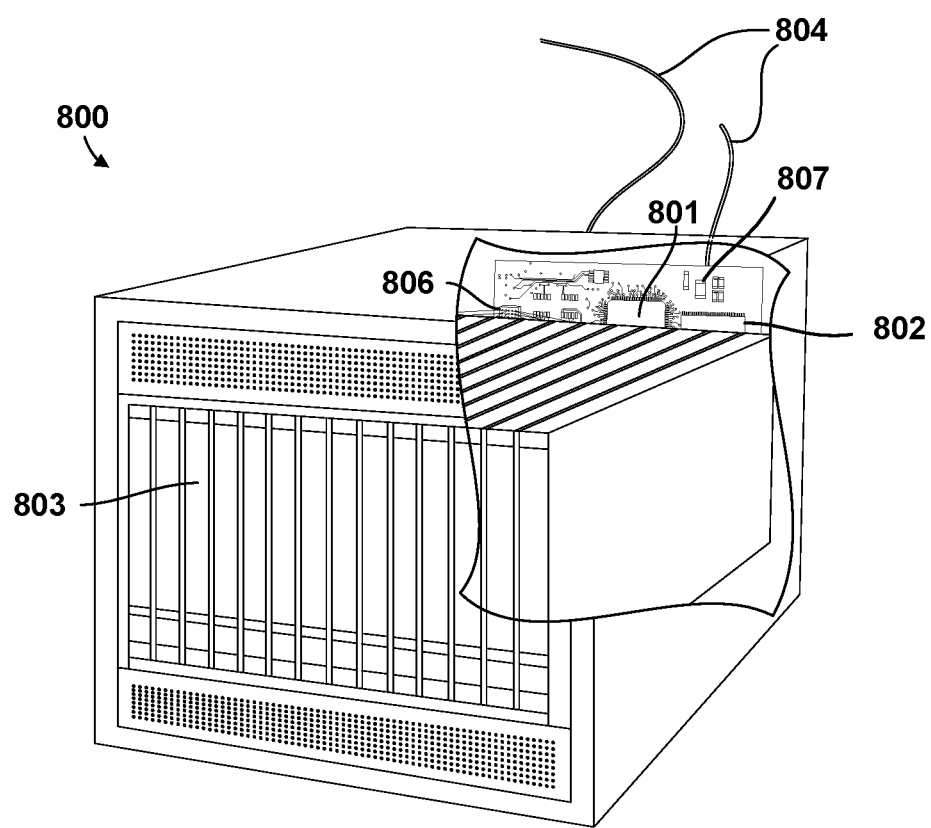
FIG. 8 is a component block diagram of a network computing device suitable for use with various embodiments.

FIG. 8 is a component block diagram of a network computing device 800, such as a base station (e.g., base station 110*a*-*d*, 350), suitable for use with various embodiments. Such network computing devices (e.g., base stations, such as gNBs, eNBs, etc.) may include at least the components illustrated in FIG. 8. With reference to FIGS. 1-8, the network computing device 800 may include a processor 801 coupled to volatile memory 802 and a large capacity nonvolatile memory, such as a disk drive 803.

The network computing device 800 may also include a peripheral memory access device such as a floppy disc drive, compact disc (CD) or digital video disc (DVD) drive 806 coupled to the processor 801. The network computing device 800 may also include network access ports 804 (or interfaces) coupled to the processor 801 for establishing data connections with a network, such as the Internet and/or a local area network coupled to other system computers and servers.

The network computing device 800 may include one or more antennas 807 for sending and receiving electromagnetic radiation that may be connected to a wireless communication link. The network computing device 800 may include additional access ports, such as USB, Firewire, Thunderbolt, and the like for coupling to peripherals, external memory, or other devices.

Figure 9:
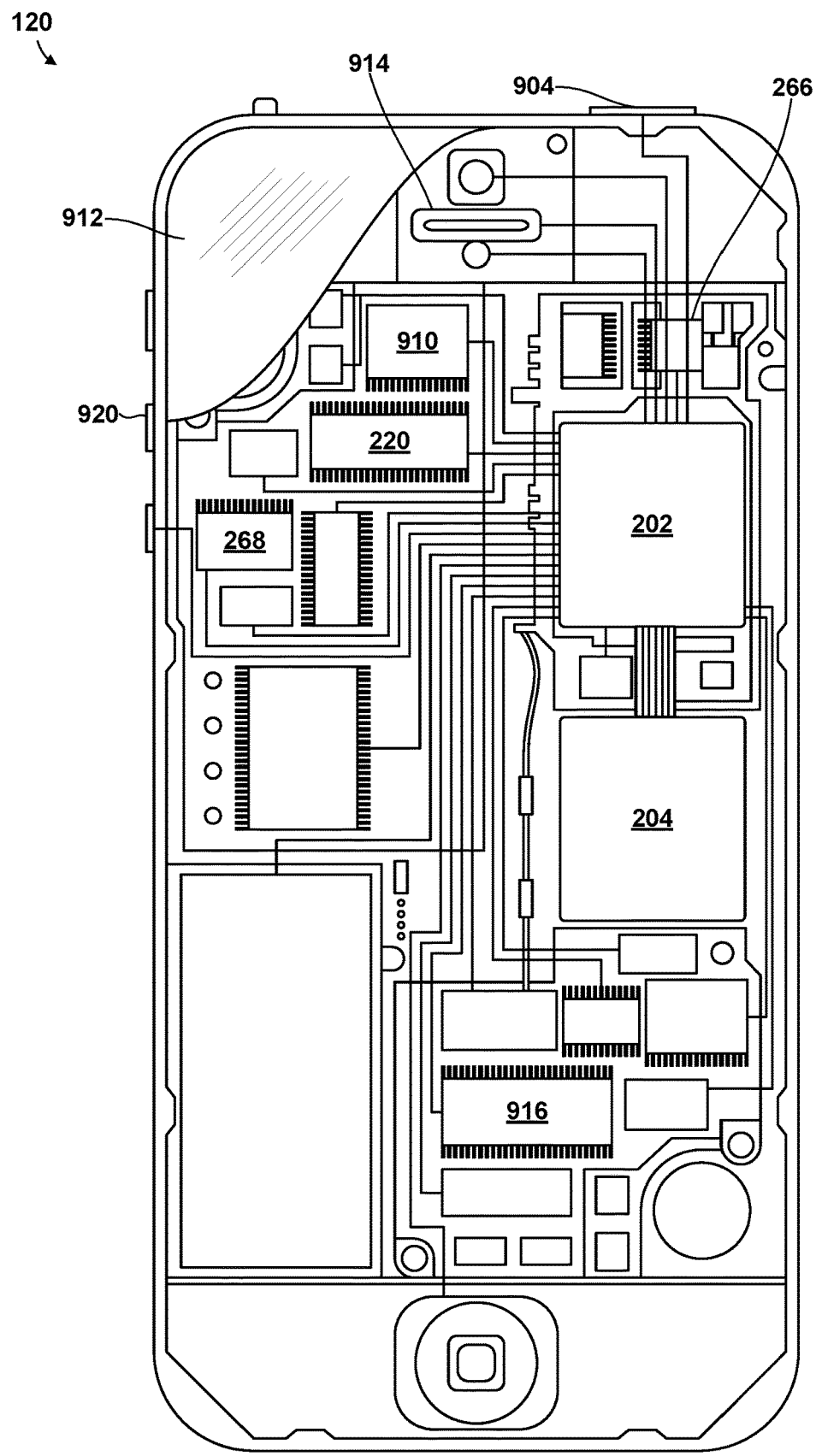
FIG. 9 is a component block diagram of a UE suitable for use with various embodiments.

FIG. 9 is a component block diagram of a UE 120 suitable for use with various embodiments. With reference to FIGS. 1-9, various embodiments may be implemented on a variety of UEs 120 (e.g., the UE 120a-120e, 200), an example of which is illustrated in FIG. 9 in the form of a smartphone. The UE 120 may include a first SOC 202 (e.g., a SOC-CPU) coupled to a second SOC 204 (e.g., a 5G capable SOC). The first and second SOCs 202, 204 may be coupled to internal memory 916, a display 912, and to a speaker 914. The first and second SOCs 202, 204 may also be coupled to at least one SIM 268 and/or a SIM interface that may store information supporting a first 5GNR subscription and a second 5GNR subscription, which support service on a 5G non-standalone (NSA) network.

The UE 120 may include an antenna 904 for sending and receiving electromagnetic radiation that may be connected to a wireless transceiver 266 coupled to one or more processors in the first and/or second SOCs 202, 204. The UE 120 may also include menu selection buttons or rocker switches 920 for receiving user inputs.

The UE 120 also includes a sound encoding/decoding (CODEC) circuit 910, which digitizes sound received from a microphone into data packets suitable for wireless transmission and decodes received sound data packets to generate analog signals that are provided to the speaker to generate sound. Also, one or more of the processors in the first and second SOCs 202, 204, wireless transceiver 266 and CODEC 910 may include a digital signal processor (DSP) circuit (not shown separately).

The processors of the wireless network computing device 800 and the UE 120 may be any programmable microprocessor, microcomputer or multiple processor chip or chips that can be configured by software instructions (applications) to perform a variety of functions, including the functions of the various embodiments described below. In some mobile devices, multiple processors may be provided, such as one processor within an SOC 204 dedicated to wireless communication functions and one processor within an SOC 202 dedicated to running other applications. Software applications may be stored in the memory 220, 916 before they are accessed and loaded into the processor. The processors may include internal memory sufficient to store the application software instructions.

Implementation examples are described in the following paragraphs. Implementation examples described in terms of example methods further include: the example methods implemented in circuitry and processors configured with processor-executable instructions to perform operations of the example methods; the example methods implemented in means for performing functions of the methods; and the example methods implemented in a non-transitory processor-readable storage medium having stored thereon processor-executable instructions configured to cause a chiplet processor to perform operations of the example methods.

Example 1. A method performed by a processor of a wireless user equipment device ("UE") for maintaining communication links with a base station of a wireless communication network, the method including: establishing with a base station a communication link supporting communication services between the UE and the base station; and transmitting a message to the base station indicating a temporary change in service availability of the UE before the temporary change in service availability occurs.

Example 2. The method of example 1, in which transmitting the message to the base station indicating the temporary change in service availability of the UE before the temporary change in service availability occurs includes transmitting a message indicating an immediate change in service availability.

Example 3. The method of any of examples 1-2, further including transmitting a message to the base station requesting resumption of full service following the conclusion of temporary change in service availability.

Example 4. The method of any of examples 1-3, in which transmitting the message to the base station indicating the temporary change in service availability of the UE before the temporary change in service availability occurs includes transmitting a message indicating a future time when the change in service availability will occur.

Example 5. The method of any of examples 1-4, in which transmitting the message to the base station indicating the temporary change in service availability of the UE before the temporary change in service availability occurs includes: determining a time schedule of temporary changes in service availability of the UE; and including the time schedule in the message transmitted to the base station.

Example 6. The method of any of examples 1-5, in which transmitting the message to the base station indicating the temporary change in service availability of the UE before the temporary change in service availability occurs includes transmitting the message indicating a time and duration when the UE will experience the temporary change in service availability.

Example 7. The method of any of examples 1-6, in which transmitting the message to the base station indicating the temporary change in service availability of the UE before the temporary change in service availability occurs includes transmitting the message indicating one or more services or procedures that the UE will not be able to perform during the temporary change in service availability.

Example 8. The method of any of examples 1-7, in which transmitting the message to the base station indicating the temporary change in service availability of the UE before the temporary change in service availability occurs includes transmitting the message indicating one or more services or procedures that the UE will be able to perform during the temporary change in service availability.

Example 9. The method of any of examples 1-8, in which transmitting the message to the base station indicating the temporary change in service availability of the UE before the temporary change in service availability occurs includes transmitting a message requesting the base station to inform the UE of one or more settings or parameters that the UE should implement after the temporary change in service availability is over.

Example 10. The method of any of examples 1-9, further including suspending radio resource management functionality by the UE during the temporary change in service availability.

Example 11. The method of any of examples 1-10, further including entering an idle radio resource control state during the temporary change in service availability.

Example 12. The method of any of examples 1-11, further including: receiving a message from the base station responding to the message transmitted to the base station; and implementing instructions in the message received from the base station, in which implementing instructions in the message received from the base station includes one of: implementing the indicated temporary change in service availability in response to the message received from the base station acknowledging or approving the temporary change in service availability; implementing service settings, parameters or procedures related to the temporary change in service availability indicated in the message received from the base station; or attempting to maintain service with the base station in response to the message received from the base station rejecting the temporary change in service availability.

Example 13. The method of any of examples 1-12, further including: receiving a message from the base station including information for one or more procedures to be implemented by the UE during the temporary change in service availability; and implementing the indicated one or more procedures during the temporary change in service availability.

Example 14. The method of any of examples 1-13, further including: receiving a message from the base station including information for one or more procedures to be implemented by the UE after the temporary change in service availability; and implementing the indicated one or more procedures upon resuming service following the temporary change in service availability.

Example 15. A method performed by a processor of a base station in a wireless communication network for maintaining wireless communications with a wireless user equipment device ("UE"), the method including: establishing with the UE a communication link supporting communication services between the UE and the base station; receiving a message from the UE indicating a temporary change in service availability of the UE; and taking an action in response to the message from the UE to accommodate the indicated temporary change in service availability.

Example 16. The method of example 15, in which taking an action in response to the message from the UE includes avoiding declaring the UE is out of service during the indicated temporary change in service availability Example 17. The method of any of examples 15-17, in which: the message received from the UE indicates an immediate change in service availability; and taking an action in response to the message from the UE includes maintaining a link with the UE during the immediate change in service availability.

Example 18. The method of any of examples 15-17, further including: receiving a message from the UE requesting resumption of service following the change in service availability; and resuming full service with UE in response to receiving the message from the UE requesting resumption of service.

Example 19. The method of any of examples 15-18, in which: the message received from the UE indicates a future time when the change in service availability of the UE will occur; and taking an action in response to the message from the UE includes scheduling communications to the UE and maintaining a link with the UE during the indicated future time when change in service availability occurs.

Example 20. The method of any of examples 15-19, in which: the message received from the UE includes a time schedule when changes in service availability of the UE will occur; and taking an action in response to the message from the UE includes scheduling communications to the UE and maintaining the link with the UE during periods of changed UE service availability identified in the time schedule.

Example 21. The method of any of examples 15-20, in which: the message received from the UE indicates a time and duration when the UE will experience the temporary change in service availability; and taking an action in response to the message from the UE includes maintaining a link with the UE at the indicated time and for the indicated duration while communications with the UE are not possible.

Example 22. The method of any of examples 15-21, in which: the message received from the UE indicates one or more services or procedures that the UE will not be able to perform during the temporary change in service availability; and taking an action in response to the message from the UE includes avoiding requesting or expecting the indicated one or more services or procedures that the UE will not be able to perform and maintaining a link with the UE during the temporary change in service availability.

Example 23. The method of any of examples 15-22, in which: the message received from the UE indicates one or more services or procedures that the UE will be able to perform during the temporary change in service availability; and taking an action in response to the message from the UE includes limiting interactions with the UE to the indicated one or more services or procedures that the UE will be able to perform during the temporary change in service availability.

Example 24. The method of any of examples 15-23, in which taking an action in response to the message from the UE includes transmitting a message to the UE acknowledging or accepting the temporary change in service availability.

Example 25. The method of any of examples 15-24, in which taking an action in response to the message from the UE includes: determining one or more adjustments to settings, parameters or procedures related to the indicate temporary change in service availability; and transmitting a message to the UE directing the UE to implement the one or more adjustments to settings, parameters or procedures during the indicate temporary change in service availability.

Example 26. The method of any of examples 15-25, in which taking an action in response to the message from the UE includes: determining whether the indicated temporary change in service availability is acceptable; and transmitting a message to the UE directing the UE to not implement the indicated temporary change in service availability in response to determining that the indicated temporary change in service availability is not acceptable Example 27. The method of any of examples 15-26, in which taking an action in response to the message from the UE includes: determining one or more procedures to be implemented by the UE during the temporary change in service availability; and transmitting a message to the UE directing the UE to implement the one or more procedures to be implemented by the UE during the temporary change in service availability.

Example 28. The method of any of examples 15-27, in which taking an action in response to the message from the UE includes: determining one or more procedures to be implemented by the UE after the temporary change in service availability; and transmitting a message to the UE directing the UE to implement the one or more procedures to be implemented by the UE after the temporary change in service availability.

As used in this application, the terms "component," "module," "system," and the like are intended to include a computer-related entity, such as, but not limited to, hardware, firmware, a combination of hardware and software, software, or software in execution, which are configured to perform particular operations or functions. For example, a component may be, but is not limited to, a process running on a processor, a processor, an object, an executable, a thread of execution, a program, and/or a computer. By way of illustration, both an application running on a UE and the UE may be referred to as a component. One or more components may reside within a process and/or thread of execution and a component may be localized on one processor or core and/or distributed between two or more processors or cores. In addition, these components may execute from various non-transitory computer readable media having various instructions and/or data structures stored thereon. Components may communicate by way of local and/or remote processes, function or procedure calls, electronic signals, data packets, memory read/writes, and other known network, computer, processor, and/or process related communication methodologies.

A number of different cellular and mobile communication services and standards are available or contemplated in the future, all of which may implement and benefit from the various embodiments. Such services and standards include, e.g., third generation partnership project (3GPP), LTE systems, third generation wireless mobile communication technology (3G), fourth generation wireless mobile communication technology (4G), fifth generation wireless mobile communication technology (5G) as well as later generation 3GPP technology, global system for mobile communications (GSM), universal mobile telecommunications system (UMTS), 3GSM, general Packet Radio service (GPRS), code division multiple access (CDMA) systems (e.g., cdmaOne, CDMA1020™), enhanced data rates for GSM evolution (EDGE), advanced mobile phone system (AMPS), digital AMPS (IS-136/TDMA), evolution-data optimized (EV-DO), digital enhanced cordless telecommunications (DECT), Worldwide Interoperability for Microwave Access (WiMAX), wireless local area network (WLAN), Wi-Fi Protected Access I & II (WPA, WPA2), and integrated digital enhanced network (iDEN). Each of these technologies involves, for example, the transmission and reception of voice, data, signaling, and/or content messages. It should be understood that any references to terminology and/or technical details related to an individual telecommunication standard or technology are for illustrative purposes only, and are not intended to limit the scope of the claims to a particular communication system or technology unless specifically recited in the claim language.

Various embodiments illustrated and described are provided merely as examples to illustrate various features of the claims. However, features shown and described with respect to any given embodiment are not necessarily limited to the associated embodiment and may be used or combined with other embodiments that are shown and described. Further, the claims are not intended to be limited by any one example embodiment.

The foregoing method descriptions and the process flow diagrams are provided merely as illustrative examples and are not intended to require or imply that the operations of various embodiments must be performed in the order presented. As will be appreciated by one of skill in the art the order of operations in the foregoing embodiments may be performed in any order. Words such as "thereafter," "then," "next," etc. are not intended to limit the order of the operations; these words are used to guide the reader through the description of the methods. Further, any reference to claim elements in the singular, for example, using the articles "a," "an," or "the" is not to be construed as limiting the element to the singular.

Various illustrative logical blocks, modules, components, circuits, and algorithm operations described in connection with the embodiments disclosed herein may be implemented as electronic hardware, computer software, or combinations of both. To clearly illustrate this interchangeability of hardware and software, various illustrative components, blocks, modules, circuits, and operations have been described above generally in terms of their functionality. Whether such functionality is implemented as hardware or software depends upon the particular application and design constraints imposed on the overall system. Skilled artisans may implement the described functionality in varying ways for each particular application, but such embodiment decisions should not be interpreted as causing a departure from the scope of the claims.

The hardware used to implement various illustrative logics, logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of receiver smart objects, e.g., a combination of a DSP and a microprocessor, a plurality of microprocessors, one or more microprocessors in conjunction with a DSP core, or any other such configuration. Alternatively, some operations or methods may be performed by circuitry that is specific to a given function.

In one or more embodiments, the functions described may be implemented in hardware, software, firmware, or any combination thereof. If implemented in software, the functions may be stored as one or more instructions or code on a non-transitory computer-readable storage medium or non-transitory processor-readable storage medium. The operations of a method or algorithm disclosed herein may be embodied in a processor-executable software module or processor-executable instructions, which may reside on a non-transitory computer-readable or processor-readable storage medium. Non-transitory computer-readable or processor-readable storage media may be any storage media that may be accessed by a computer or a processor. By way of example but not limitation, such non-transitory computer-readable or processor-readable storage media may include RAM, ROM, EEPROM, FLASH memory, CD-ROM or other optical disk storage, magnetic disk storage or other magnetic storage smart objects, or any other medium that may be used to store desired program code in the form of instructions or data structures and that may be accessed by a computer. Disk and disc, as used herein, includes compact disc (CD), laser disc, optical disc, digital versatile disc (DVD), floppy disk, and Blu-ray disc where disks usually reproduce data magnetically, while discs reproduce data optically with lasers. Combinations of the above are also included within the scope of non-transitory computer-readable and processor-readable media. Additionally, the operations of a method or algorithm may reside as one or any combination or set of codes and/or instructions on a non-transitory processor-readable storage medium and/or computer-readable storage medium, which may be incorporated into a computer program product.

The preceding description of the disclosed embodiments is provided to enable any person skilled in the art to make or use the claims. Various modifications to these embodiments will be readily apparent to those skilled in the art, and the generic principles defined herein may be applied to other embodiments without departing from the scope of the claims. Thus, the present disclosure is not intended to be limited to the embodiments shown herein but is to be accorded the widest scope consistent with the following claims and the principles and novel features disclosed herein.

What is claimed is:

1. A method performed by a wireless user equipment (UE), the method comprising:
   establishing with a base station a communication link supporting communication services between the UE and the base station;
   determining an anticipated temporary change in service availability of the UE based on an anticipated movement of the UE; and
   transmitting a message to the base station indicating the anticipated temporary change in service availability of the UE before the anticipated movement of the UE.

2. The method of claim 1, further comprising transmitting a message to the base station requesting resumption of full service following conclusion of the temporary change in service availability.

3. The method of claim 1, wherein transmitting the message to the base station indicating the anticipated temporary change in service availability of the UE before the anticipated movement of the UE comprises at least one of:
   transmitting a message indicating a future time when a change in service availability will occur;
   including a time schedule of temporary changes in service availability of the UE in the message transmitted to the base station;
   transmitting a message indicating a time and duration when the UE will experience the temporary change in service availability;
   transmitting a message indicating one or more services or procedures that the UE will not be able to perform during the temporary change in service availability;
   transmitting a message indicating one or more services or procedures that the UE will be able to perform during the temporary change in service availability; or
   transmitting a message requesting the base station to inform the UE of one or more settings or parameters that the UE should implement after the temporary change in service availability.

4. The method of claim 1, further comprising suspending radio resource management functionality by the UE during the temporary change in service availability.

5. The method of claim 1, further comprising entering an idle radio resource control state during the temporary change in service availability.

6. The method of claim 1, further comprising:
   receiving a message from the base station responding to the message transmitted to the base station; and
   implementing instructions in the message received from the base station, wherein implementing instructions in the message received from the base station comprises one of:
      implementing an indicated temporary change in service availability in response to the message received from the base station acknowledging or approving the temporary change in service availability;
      implementing service settings, parameters or procedures related to the temporary change in service availability indicated in the message received from the base station; or
      attempting to maintain service with the base station in response to the message received from the base station rejecting the temporary change in service availability.

7. The method of claim 1, further comprising:
   receiving a message from the base station including information for one or more procedures to be implemented by the UE during the temporary change in service availability; and
   implementing the one or more procedures during the temporary change in service availability.

8. The method of claim 1, further comprising:
   receiving a message from the base station including information for one or more procedures to be implemented by the UE after the temporary change in service availability; and
   implementing the one or more procedures upon resuming service following the temporary change in service availability.

9. A wireless user equipment (UE), comprising:
   a wireless transceiver; and
   a processor coupled to the wireless transceiver and configured to:
      establish with a base station a communication link supporting communication services between the UE and the base station;
      determine an anticipated temporary change in service availability of the UE based on an anticipated movement of the UE; and
      transmit a message to a base station indicating the anticipated temporary change in service availability of the UE before the anticipated movement of the UE.

10. The UE of claim 9, wherein the processor is further configured to transmit a message to the base station requesting resumption of full service following conclusion of temporary change in service availability.

11. The UE of claim 9, wherein the processor is further configured to transmit the message to the base station indicating the anticipated temporary change in service availability of the UE before the anticipated movement of the UE that includes at least one of:
   a message indicating a future time when a change in service availability will occur;
   a time schedule of temporary changes in service availability of the UE in the message transmitted to the base station;
   a message indicating a time and duration when the UE will experience the temporary change in service availability;
   a message indicating one or more services or procedures that the UE will not be able to perform during the temporary change in service availability;

a message indicating one or more services or procedures that the UE will be able to perform during the temporary change in service availability; or a message requesting the base station to inform the UE of one or more settings or parameters that the UE should implement after the temporary change in service availability.

12. The UE of claim 9, wherein the processor is further configured to suspend radio resource management functionality by the UE during the temporary change in service availability.

13. The UE of claim 9, wherein the processor is further configured to entering an idle radio resource control state during the temporary change in service availability.

14. The UE of claim 9, wherein the processor is further configured to:
receive a message from the base station responding to the message transmitted to the base station; and
implement instructions in the message received from the base station including one of:
implementing an indicated temporary change in service availability in response to the message received from the base station acknowledging or approving the temporary change in service availability;
implementing service settings, parameters or procedures related to the temporary change in service availability indicated in the message received from the base station; or
attempting to maintain service with the base station in response to the message received from the base station rejecting the temporary change in service availability.

15. The UE of claim 9, wherein the processor is further configured to:
receive a message from the base station including information for one or more procedures to be implemented by the UE during the temporary change in service availability; and
implement the one or more procedures during the temporary change in service availability.

16. The UE of claim 9, wherein the processor is further configured to:
receive a message from the base station including information for one or more procedures to be implemented by the UE after the temporary change in service availability; and
implement the one or more procedures upon resuming service following the temporary change in service availability.

17. A method performed by a base station in a wireless communication network for maintaining wireless communications with a wireless user equipment (UE), the method comprising:
establishing with the UE a communication link supporting communication services between the UE and the base station;
receiving a message from the UE indicating an anticipated temporary change in service availability of the UE due to an anticipated movement of the UE; and
taking an action in response to the message from the UE to accommodate the anticipated temporary change in service availability due to the anticipated movement of the UE.

18. The method of claim 17, further comprising:
receiving a message from the UE requesting resumption of service following a change in service availability of the UE; and resuming full service with UE in response to receiving the message from the UE requesting resumption of service.

19. The method of claim 17, wherein taking the action in response to the message from the UE comprises at least one of:
refraining from declaring the UE is out of service during an indicated temporary change in service availability;
transmitting a message to the UE acknowledging or accepting a temporary change in service availability;
determining one or more adjustments to settings, parameters or procedures related to the indicate temporary change in service availability, and transmitting a message to the UE directing the UE to implement the one or more adjustments to settings, parameters or procedures during the indicate temporary change in service availability;
determining whether the indicated temporary change in service availability is acceptable, and transmitting a message to the UE directing the UE to not implement the indicated temporary change in service availability in response to determining that the indicated temporary change in service availability is not acceptable;
determining one or more procedures to be implemented by the UE during the temporary change in service availability, and transmitting a message to the UE directing the UE to implement the one or more procedures to be implemented by the UE during the temporary change in service availability; or
determining one or more procedures to be implemented by the UE after the temporary change in service availability, and transmitting a message to the UE directing the UE to implement the one or more procedures to be implemented by the UE after the temporary change in service availability.

20. The method of claim 17, wherein taking the action in response to the message from the UE comprises maintaining a link with the UE during the temporary change in service availability.

21. The method of claim 17, wherein in response to the message received from the UE indicating a future time when a change in service availability of the UE will occur, taking the action in response to the message from the UE comprises scheduling communications to the UE and maintaining a link with the UE during the indicated future time when the change in service availability occurs.

22. The method of claim 17, wherein in response to the message received from the UE including a time schedule when changes in service availability of the UE will occur, taking the action in response to the message from the UE comprises scheduling communications to the UE and maintaining a link with the UE during periods of changed UE service availability identified in the time schedule.

23. The method of claim 17, wherein in response to the message received from the UE indicates a time and duration when the UE will experience the temporary change in service availability, taking the action in response to the message from the UE comprises maintaining a link with the UE at the indicated time and for the indicated duration while communications with the UE are not possible.

24. The method of claim 17, wherein in response to the message received from the UE indicates one or more services or procedures that the UE will not be able to perform during the temporary change in service availability, taking the action in response to the message from the UE comprises refraining from requesting or expecting the indicated one or more services or procedures that the UE will not be able to perform and maintaining a link with the UE during the temporary change in service availability.

25. The method of claim 17, wherein in response to the message received from the UE indicating one or more services or procedures that the UE will be able to perform during the temporary change in service availability, taking the action in response to the message from the UE comprises limiting interactions with the UE to the indicated one or more services or procedures that the UE will be able to perform during the temporary change in service availability.

26. A base station, comprising:
a processor configured with processor-executable instructions to perform operations comprising:
establishing with a wireless user equipment (UE) a communication link supporting communication services between the UE and the base station;
receiving a message from a wireless user equipment (UE) indicating an anticipated temporary change in service availability of the UE due to an anticipated movement of the UE; and
taking an action in response to the message from the UE to accommodate the anticipated temporary change in service availability due to the anticipated movement of the UE.

27. The base station of claim 26, wherein the processor is configured with processor-executable instructions to perform operations further comprising:
receiving a message from the UE requesting resumption of service following the temporary change in service availability of the UE; and
resuming full service with UE in response to receiving the message from the UE requesting resumption of service.

28. The base station of claim 26, wherein the processor is configured with processor-executable instructions to perform operations such that taking the action in response to the message from the UE comprises at least one of:
refraining from declaring the UE is out of service during the indicated temporary change in service availability;
transmitting a message to the UE acknowledging or accepting the temporary change in service availability;
determining one or more adjustments to settings, parameters or procedures related to the indicate temporary change in service availability, and transmitting a message to the UE directing the UE to implement the one or more adjustments to settings, parameters or procedures during the indicate temporary change in service availability;
determining whether the indicated temporary change in service availability is acceptable, and transmitting a message to the UE directing the UE to not implement the indicated temporary change in service availability in response to determining that the indicated temporary change in service availability is not acceptable;
determining one or more procedures to be implemented by the UE during the temporary change in service availability, and transmitting a message to the UE directing the UE to implement the one or more procedures to be implemented by the UE during the temporary change in service availability; or
determining one or more procedures to be implemented by the UE after the temporary change in service availability, and transmitting a message to the UE directing the UE to implement the one or more procedures to be implemented by the UE after the temporary change in service availability.

29. The base station of claim 26, wherein the processor is configured with processor-executable instructions to perform operations such that:
taking the action in response to the message from the UE comprises maintaining a link with the UE during the change in service availability;
in response to the message received from the UE indicating a future time when a change in service availability of the UE will occur, taking the action in response to the message from the UE comprises scheduling communications to the UE and maintaining a link with the UE during the indicated future time when the change in service availability occurs;
in response to the message received from the UE indicates a time and duration when the UE will experience the temporary change in service availability, taking the action in response to the message from the UE comprises maintaining a link with the UE at the indicated time and for the indicated duration while communications with the UE are not possible;
in response to the message received from the UE including a time schedule when changes in service availability of the UE will occur; and taking the action in response to the message from the UE comprises scheduling communications to the UE and maintaining the link with the UE during periods of changed UE service availability identified in the time schedule;
in response to the message received from the UE indicates one or more services or procedures that the UE will not be able to perform during the temporary change in service availability, taking the action in response to the message from the UE comprises refraining from requesting or expecting the indicated one or more services or procedures that the UE will not be able to perform and maintaining a link with the UE during the temporary change in service availability; or
in response to the message received from the UE indicating one or more services or procedures that the UE will be able to perform during the temporary change in service availability, taking the action in response to the message from the UE comprises limiting interactions with the UE to the indicated one or more services or procedures that the UE will be able to perform during the temporary change in service availability.

* * * * *